(12) United States Patent
Kolb

(10) Patent No.: US 11,690,478 B2
(45) Date of Patent: Jul. 4, 2023

(54) STACKABLE COOKING APPARATUS

(71) Applicant: Timothy Kolb, New Durham, NH (US)

(72) Inventor: Timothy Kolb, New Durham, NH (US)

( * ) Notice: Subject to any disclaimer, the term of this patent is extended or adjusted under 35 U.S.C. 154(b) by 450 days.

(21) Appl. No.: 13/831,460

(22) Filed: Mar. 14, 2013

(65) Prior Publication Data

US 2014/0261010 A1    Sep. 18, 2014

(51) Int. Cl.
*A47J 37/07* (2006.01)
*A47J 27/13* (2006.01)

(52) U.S. Cl.
CPC .......... *A47J 37/0786* (2013.01); *A47J 27/13* (2013.01); *Y10T 29/49826* (2015.01)

(58) Field of Classification Search
CPC .............. A47J 27/13; A47J 37/0786
USPC ......... 99/342, 447, 340, 349, 385, 393, 448, 99/449, 473, 474, 476, 450; 219/400, 219/401, 391, 392
See application file for complete search history.

(56) References Cited

U.S. PATENT DOCUMENTS

| | | |
|---|---|---|
| 334,400 A | 1/1886 | Wiegland |
| 370,945 A | 10/1887 | Holt |
| 615,457 A | 12/1898 | Martin |
| 747,100 A | 12/1903 | Stockton |
| 1,024,213 A | 4/1912 | Long |
| 2,200,180 A | 5/1940 | Kullberg |
| 3,641,926 A * | 2/1972 | Williams ............... A47J 27/13  219/430 |
| 3,952,721 A | 4/1976 | Patterson |
| 4,441,015 A * | 4/1984 | Eichelberger et al. ....... 219/411 |
| 4,466,419 A | 8/1984 | Syme |
| 4,527,538 A | 7/1985 | Caferro |
| 4,793,324 A | 12/1988 | Caferro |
| 6,314,955 B1 * | 11/2001 | Boetcker ...................... 126/9 R |
| 6,520,173 B2 | 2/2003 | Lautner |
| 8,001,955 B1 | 8/2011 | Bourgeois et al. |
| 8,272,601 B2 | 9/2012 | Kocher |
| 2006/0225724 A1 | 10/2006 | Turner |
| 2008/0308087 A1 | 12/2008 | Rosenzweig |
| 2010/0192936 A1 | 8/2010 | Gokturk |

(Continued)

OTHER PUBLICATIONS

Google Search #1 "How to Make an Oven From Recycled Cans" Website Link http://www.ehow.com/how_6059864_build-outdoor-beehive-oven.html Downloaded on Dec. 9, 2012.

(Continued)

*Primary Examiner* — Phuong T Nguyen

(74) *Attorney, Agent, or Firm* — Lambert Shorten & Connaughton; David J. Connaughton, Jr.; Justin P. Tinger

(57) ABSTRACT

An apparatus includes a lower vessel and an upper vessel mounted atop the lower vessel. The lower vessel, which can be disposed on the heated surface of a stove, includes a first top wall having apertures therethrough, and defines a first volume in the lower vessel. The upper vessel includes a second top wall free of apertures, and defines a second volume in the upper vessel. Food items to be cooked are placed on the first top wall so that the food item resides in the second volume. Heat from the heated surface rises into the first volume, through the apertures and into the second volume, to cook the food item therein. Means are provided for maintaining the vertical stability of the vessels when the vessels are stacked.

10 Claims, 22 Drawing Sheets

(56) References Cited

U.S. PATENT DOCUMENTS

2011/0023724 A1\* 2/2011 Beard et al. .................... 99/340
2011/0318456 A1 12/2011 Walraevens

OTHER PUBLICATIONS

Google Search #2 "Coleman Camp Oven on the Woodstove" Website Link http://www.youtube.com/watch?v=XtR8tPJglio&feature=player_detailpage Downloaded on Dec. 9, 2012.
Google Search #3 "Sierra Zip Backpack Stove" Website Link: http://www.digitalmarketingusa.com/ZipStove.html Downloaded on Dec. 9, 2012.
Google Search #4 "AGA Stove Rocket Conversion" Website Link: http://www.permies.eom/t/9451/stoves/AGA-stove-rocket-conversion Downloaded on Dec. 9, 2012.

\* cited by examiner

STACKABLE COOKING APPARATUS

FIELD OF THE INVENTION

This invention generally relates to cookware, and more specifically to cooking apparatus.

BACKGROUND OF THE INVENTION

It is known that cooking apparatus, such as roasting and baking ovens, are used by individual consumers, delicatessens, hotels, movie theaters, food service providers, and others to cook a variety of foods, such as meat, sea food and vegetables. In addition, modem ovens sometimes include advanced control systems including temperature control, on-board diagnostics and remote operability to cook the food item. Energy sources for the ovens are typically wood, electricity, natural gas, liquid propane, infrared heating elements and microwave radiation.

Use of ovens for roasting, broiling and baking, rather than use of other types of cooking apparatus, obtains several distinct advantages. A primary advantage is versatility. That is, a single oven, which is defined herein as an enclosed or open chamber designed to heat food, can be repeatedly used to cook a variety of foods. In this regard, there are several types of commercially available ovens that possess this versatility. These types of ovens include conventional ovens, convection ovens, rotisseries, combination oven/steamers, conveyor-type ovens (e.g., so-called "pizza ovens"), infrared ovens and microwave ovens. Each of these types of ovens is briefly discussed hereinbelow.

In this regard, a conventional oven uses convective heat transfer without fans, and allows the user to quickly broil food by means of a heating element located in the top portion of the oven. However, conventional ovens may develop hot spots that can result in uneven cooking of food due to the absence of fans to circulate or swirl heated air around the food.

A convection oven uses convective heat transfer with fans, so that air is blown from the outside of the oven to the inside of the oven. Also, a heating element may be located near the fan to warm the blowing air and speed the cooking process. In addition, filters may be present to prevent dust particles from being blown from the outside to the inside of the oven and to prevent grease and food particles from being blown from the inside to the outside of the oven. The continuous swirling of heated air inside the oven allows more even heating of the food compared to conventional ovens. In addition, convection ovens with fans use lower temperatures and cook foods in less time.

A rotisserie oven roasts meat skewered on a long, rotating, solid rod or spit. The rotating rotisserie spit evenly cooks the meat and allows self-basting of the meat, so that the meat cooks in its own juices. The speed of the rotating spit can vary depending on the type of meat, amount of heat produced by the heat source and how close the meat is to the heat source.

A combination convection oven/steamer oven (e.g., a so-called "combi-steamer") combines a convection oven and a steam cooker. Such an oven provides either dry heat, moist heat or a combination of dry and moist heat at a variety of predetermined temperatures. Thus, this type of oven can be used in baking, roasting, grilling, steaming, braising, poaching and other cooking processes.

A conveyor-type oven cooks a plurality of food items in a continuous process on a conveyor belt moving through the oven at a predetermined speed. A conveyor-type oven can be configured in various forms. For example, a form of conveyor-type oven is an "impingement oven" that supplies hot air both from above and below the food item as the conveyor moves the food item through the oven. Such ovens can cook large quantities of food items usually without human intervention. These ovens, which use convective heat transfer, are typically utilized to cook identical food items (e.g., pizza) in an automated process.

An infrared or radiant heat oven can transfer a large amount of heat to a food item quickly. Infrared or radiant heating transfers heat using electromagnetic waves of energy from a heat source to the food item to be heated. Presence of air is not required; therefore, cooking with infrared heating elements requires no air movement. The food item to be cooked absorbs the radiant heat. Sources of infrared radiant heat energy can be electric, natural gas, liquid propane or other heat sources. In addition, if desired, infrared heating can be combined with air convection provided by a fan to obtain more even heating of the food item.

A microwave oven heats a food item by means of dielectric heating (i.e., heating of poor conductors of electricity) with electromagnetic microwave radiation that excites molecules in the food item. The source of microwave energy is typically a magnetron tube containing beryllium. Except in the case of thick and dense food items, microwave cooking can heat the food item evenly and quickly. Typically, microwave ovens are used to reheat previously heated foods and also for heating vegetables.

However, there are adverse considerations associated with the ovens mentioned hereinabove. Conventional ovens, which do not use fans, may not evenly cook a food item because a fan is not used to swirl heated air around the food item. Thus, heat from the heat source may not reach every area of the oven. Also, a user of a conventional oven should be careful to avoid placing a non-heat conducting object between the heat source and the food item being cooked because presence of the non-heat conducting object may otherwise hinder proper cooking of the food item.

Convection ovens, which do use fans to circulate air, require users to learn how to use convection ovens in order to properly cook food. This so because many food recipes are written for use with conventional ovens. Thus, users of convection ovens may be required, through trial and error, to adjust temperatures and cooking times to compensate for use of a convection oven rather than a conventional oven. Although convection ovens may reduce energy costs compared to conventional ovens, the initial price of a convection oven is usually greater due, for example, to presence of fans and the previously mentioned filters.

Rotisserie ovens require the rotating spit to be placed through the center of gravity of the food item for proper balancing of the food item on the spit. Otherwise, improper balancing of the food item on the spit can cause the mechanical mechanism rotating the spit to eventually fail. Also, many states in the United States, and many foreign countries, require rotisserie ovens for cooking meat and poultry to be disposed under a hood to vent smoke and moisture out of a building where the cooking occurs. This is required in order not to adversely affect air quality within the building. Thus, use of a rotisserie oven often requires the added expense of providing a hood over the rotisserie oven. In addition, use of the skewer requires time to clean the skewer preferably after each use.

Cambi-steamer ovens may be difficult to maintain due to presence of more parts, complex components and requirements for preventative maintenance. This is particularly true with regard to the steam generator portion of the combi-steam oven. Also, a user should be careful when opening the door of a combi-steam oven because heated steam might be undesirably released onto the user. Further, combi-steam ovens can be more expensive to purchase and operate compared to other types of ovens.

Conveyor-type ovens require a larger "foot print" compared to many other types of ovens. Thus, conveyor-type ovens are more suitable for high-volume automated food cooking processes and are not as suitable for use by individual consumers. Also, a conveyor-type oven, which includes a conveyor belt, may be more at risk of malfunction and inoperability due to a mechanical failure occurring in the mechanism operating the conveyor belt. In addition, conveyor-type ovens may require more time to clean due to their more complex mechanical structure compared to other types of ovens. Moreover, conveyor-type ovens are initially more expensive to purchase compared to other types of ovens.

In the case of infrared ovens, only the portion of the food item directly exposed to the infrared radiation will heat. Consequently, a plurality of infrared heating elements positioned around the food item may be required to evenly heat the food item. Addition of multiple infrared heating elements will generally increase the initial cost of the infrared oven. Alternatively, when a single infrared heat source is used, suitable placement of the food item relative to the infrared heat source is extremely important, such that the food item is directly exposed to the infrared radiation. Thus, there should not be any intervening obstruction that might interfere with or block the infrared radiation, so that the food item is properly cooked. Also, when using an infrared heat source, the food item exposure time should be closely monitored and controlled due to the high rate of heat transfer.

Microwave ovens have limitations on what can be cooked in them. In this regard, metal objects, such as a metal pan containing the food, aluminum foil wrapping the food, metallic trim on china plates or cups containing the food, and the like, should not be used in a microwave oven. This is so because the metal functions as an antenna for electrical current and can lead to fire and explosion. In addition, "burnout" can occur if the microwave oven is operated without a food item in the microwave oven. In this case, the microwaves heat the magnetron tube itself and may cause the magnetron tube to rupture and release poisonous beryllium therefrom, which is a highly undesirable result. In addition, when operated improperly, the microwaves may cause the contents in the oven to superheat (i.e., heating to a temperature above the boiling point of the solid food or beverage being microwaved). When the food item is moved by the user after being microwaved, the superheated food item may erupt and injure the user.

The various types of ovens mentioned hereinabove may be vertically placed one upon the other. However, each oven will have its own individual heating source, so that a plurality of individual heating sources is required. For example, a plurality of microwave ovens may be placed one upon the other. In this case, however, each of the microwave ovens requires its own, individual magnetron tube to provide microwave energy. This requirement for a plurality of magnetron tubes increases cost of the stacked microwave oven installation.

Attempts have been made to address the considerations mentioned hereinabove with respect to conveniently, inexpensively and safely cooking food items. For example, U.S. Pat. No. 1,024,918 titled "Cooker" issued Apr. 23, 1912, in the name of George A. Long relates to improvements in cookers.

According to the Long patent, an improved cooker is provided for baking or steaming potatoes and other articles. The Long device includes a base that is preferably pan-like and cylindrical. A top is dome-like in shape and provided with cylindrical side walls adapted to telescope into the side walls of the base. The lower edges of the side walls of the top are adapted to rest on the base. Within the top is a dome-shaped inner wall that is adapted to be adjusted within the top. The top and inner wall are provided with vents that can be opened and closed. The lower edge of the inner wall is preferably turned or spun outwardly to slidably engage the side walls of the top, so that the inner wall is adjustably supported in a spaced relation to the walls of the top. The inner wall of the structure has a cover of asbestos. The top has a handle. The base is provided with keepers and the top is provided with coacting catches, which are engaged with the keepers by turning the top on the base. Articles to be cooked, such as potatoes, are placed in a holder consisting of a band-like rim in which is supported a rack that is wire woven onto a ring supported on the band. To steam the potato, the vent in the top is closed. To bake the potato, the vent in the top is opened to permit moisture to escape. According to this patent, the improved cooker is adapted to be placed on the top of a coal or wood stove, or over a gas burner.

However, the Long device appears to require that the inner wall in the structure have a cover of asbestos. Exposure to asbestos, which is a group of minerals occurring naturally in the environment as bundles of fibers, has been linked to increased risk of asbestosis, nonmalignant lung and pleural abnormalities (i.e., pain while breathing), lung cancer, malignant mesothelioma (e.g., cancer affecting the lining covering body organs, such as the lungs) and other cancers, according to the National Cancer Institute, which is part of the National Institutes of Health under the U.S. Department of Health and Human Services.

Another attempt to address the considerations mentioned hereinabove with respect to conveniently, inexpensively and safely cooking food items is disclosed in U.S. Pat. No. 4,466,419 titled "Cooking Method And Apparatus For Use With Wood-Burning Stove" issued Aug. 21, 1984, in the name of Duncan C. Syme. This patent relates to cooking adapted to a wood-burning heating apparatus.

More specifically, the Syme device features, in a wood-burning heating apparatus, a frame enclosing a combustion chamber. The frame has a frame aperture in the top of the frame, the frame aperture being in communication with the combustion chamber and also in communication with a downdraft flowing through the uncovered frame aperture when wood is burning in the combustion chamber. The food cooker is inserted at least partially into the aperture in the top of the frame. In this manner, food is cooked in the top of the frame/wood stove. The method of using the device includes uncovering the frame aperture, placing a cooking surface on which food can be cooked in an operative relation to the frame aperture and providing a heat source (i.e., burning wood) in operative relation to the cooking surface. An unimpeded communication is provided between the cooking surface and the combustion chamber, so that cooking by-products will be carried by the downdraft through the frame aperture in the combustion chamber and thereafter exhausted elsewhere. Thus, the Syme patent teaches that the cooker is an integral part of a uniquely configured wood-burning stove.

SUMMARY OF THE INVENTION

The present invention addresses the shortcomings of the prior art approaches mentioned hereinabove by providing a stackable cooking apparatus for cooking a food item, and a method of manufacturing the stackable cooking apparatus. In this regard, the stackable cooking apparatus is adapted to rest on a heated surface, such as the top of a wood burning stove, so that heat therefrom enters the cooking apparatus. However, the heat source need not be supplied by combustion of wood. Rather, the heat source may be supplied by combustion of other suitable materials, such as liquid propane or properly vented burning charcoal. Alternatively, the heat source may be a radiant heat source.

The stackable cooking apparatus includes a lower vessel and an upper vessel mounted atop the lower vessel. The lower vessel may be cylindrical with a generally cylindrical sidewall having an open bottom end, and a laterally extending, planer top wall connected to a top end of the sidewall. The top wall of the cylindrical lower vessel defines a plurality of perforations for passage of heat therethrough. The upper vessel, which also may be generally cylindrical, has a cylindrical sidewall, an open bottom end and a laterally extending, planer top wall without perforations, such that the top wall is closed. The top wall belonging to the upper vessel is connected to a top end of the sidewall of the upper vessel.

In one embodiment, a plurality of gripping members extends around a perimeter of a lower end portion of the upper vessel for manually gripping and lifting the upper vessel away from the lower vessel and for manually lowering the upper vessel onto the lower vessel. Alternatively, a handle may be coupled to the upper vessel for lifting and lowering the upper vessel. The gripping members are also configured to allow the lower end portion of the upper vessel to snugly fit the top end portion of the lower vessel. Snugly fitting the lower end portion of the upper vessel to the top end portion of the lower vessel assists in vertically stabilizing the upper vessel and lower vessel when the upper vessel is mounted atop the lower vessel. Alternatively, the lower end portion of the upper vessel may be inwardly crimped to allow the lower end portion of the upper vessel to snugly fit a recessed portion defined near the top wall of the lower vessel when the upper vessel is mounted atop the lower vessel. As previously mentioned, snugly fitting the upper vessel to the lower vessel assists in vertically stabilizing the upper vessel and lower vessel when the upper vessel is mounted atop the lower vessel.

When the upper vessel is mounted atop the lower vessel, a cooking chamber or volume is established in the upper vessel. The cooking chamber is bounded by the cylindrical sidewall of the upper vessel, the closed top wall of the upper vessel and the perforate top wall of the lower vessel. The food item to be cooked, such as a potato wrapped in aluminum foil, is placed in the cooking chamber by lifting the upper vessel away from the lower vessel, disposing the food item onto the perforate top wall of the lower vessel, and then lowering the upper vessel onto the lower vessel. A temperature sensor, such as a thermometer or heat-sensitive temperature label, can be coupled to the upper vessel, if desired, and can be in heat sensing communication with the cooking chamber for sensing temperature in the cooking chamber. In addition, the upper vessel and lower vessel need not be cylindrical. Rather, the upper and lower vessels may be any suitable shape, such as in the shape of a parallelepiped (i.e., square or rectangular in transverse cross section).

In addition, there may be virtually any number of vessels stacked one upon the other. For example, rather than only the upper vessel and the lower vessel, there may be an intermediate vessel interposed between the upper vessel and lower vessel. The intermediate vessel would also have a perforate top wall for allowing convective heat transfer therethrough and into the cooking chamber defined by the upper vessel. That is, the convective heat transfer would flow along a path extending from the lower vessel, through the perforate top wall of the lower vessel to heat a food item disposed on the perforate top wall of the lower vessel, and through the perforate top wall of the intermediate vessel to heat another food item disposed on the perforate top wall of the intermediate vessel. When a food item is disposed on the perforate top wall of the lower vessel, the food item is disposed within the intermediate vessel. Also, when another food item is disposed on the perforate top wall of the intermediate vessel, the food item is disposed within the upper vessel. This configuration of the invention allows simultaneous cooking of more than one food item. Thus, one food item is cooked while disposed within the intermediate vessel and another food item is simultaneously cooked while disposed within the upper vessel.

As previously mentioned, the lower vessel, intermediate vessel and upper vessel can be stacked one upon the other. In one embodiment, a plurality of locking assemblies is coupled to respective ones of the upper vessel, the intermediate vessel and the lower vessel. The locking assemblies releasably interlock the upper vessel, the intermediate vessel and the lower vessel. Interlocking the upper vessel, the intermediate vessel and the lower vessel reduces the risk that the upper vessel, the intermediate vessel and the lower vessel will separate if inadvertently bumped or moved during the cooking process. Also, the locking assemblies, in combination with the previously mentioned handle, allow the stackable cooking apparatus to be conveniently portable.

In the case of using the two-vessel embodiment of the invention, the upper vessel is lifted to place the food item onto the perforate top wall of the lower vessel. Heat from the heat source, such as the heated top surface of a wood burning stove, flows into the lower vessel by means of convective heat transfer without use of fans. Then, the heat flows along a heat transfer flow path extending from the interior of the lower vessel, through the perforations defined by the top wall of the lower vessel and into the cooking chamber in order to heat the food item. After a predetermined time, depending on the particular food item to be cooked and distance between the cooking chamber and the heat source, the upper vessel is again lifted to retrieve the cooked food item. After the food item is retrieved, the upper vessel is replaced onto the lower vessel or elsewhere.

Thus, the cooking apparatus is versatile. This is so because the cooking apparatus is not limited to cooking one food item at a time. In this regard, virtually any number of cooking vessels can be stacked to allow simultaneous cooking of more than one food item. Also, use of the cooking apparatus is economical. That is, only one heat source is required, rather than a plurality of heat sources disposed in each of the stacked vessels. This provision for only one heat source reduces the complexity, initial cost and operating cost of the cooking apparatus. In addition, the handle or the gripping members are provided on the upper vessel to allow convenient manual lifting and lowering of the upper vessel. Convenient manual lifting and lowering of the upper vessel allows for quickly placing the food item in the cooking chamber and for quickly retrieving the food item from the cooking chamber defined in the upper vessel. Further, the temperature sensor allows a user of the cooking apparatus to conveniently monitor temperature in the cooking chamber in order to properly cook the food item at the required temperature. Moreover, the cooking apparatus may be heated by various heat sources in addition to combustion of wood. More specifically, the heat source can be combustion of liquid propane, properly vented charcoal, and other heat sources, such as a radiant element heat source. In addition, the cooking apparatus can be used in association with a conventional bar-b-que grill or suitable campsite oven.

According to an aspect of the present invention, there is provided a stackable cooking apparatus for cooking a food item, the stackable cooking apparatus being supportable by a heat source, the stackable cooking apparatus including: a lower vessel having a top wall adapted to support the food item thereon and defining a perforation through the top wall, the lower vessel defining a recess in an upper portion thereof; and an upper vessel adapted to be mounted atop the lower vessel and substantially surround the food item, the upper vessel being adapted to receive heat thereinto flowing from the lower vessel, through the perforation and into the upper vessel to heat the upper vessel for cooking the food item, the upper vessel having a crimped end portion for mating engagement with the recess.

According to another aspect of the present invention, there is provided a stackable cooking apparatus for cooking a food item, the stackable cooking apparatus, the stackable cooking apparatus being supportable by a heat source, the stackable cooking apparatus including: a lower vessel having at least one first sidewall and a first top wall defining a first volume therebetween, the first top wall being adapted to support the food item thereon and defining a plurality of perforations through the first top wall, the lower vessel defining a recess in an upper portion thereof; and an upper vessel adapted to be coaxially mounted atop the lower vessel, the upper vessel having at least one second sidewall and a second top wall defining a second volume therebetween for substantially surrounding the food item supported by the first top wall, the second volume being adapted to receive heat thereinto flowing along a heat transfer flow path extending from the first volume, through the plurality of perforations and into the second volume, the upper vessel having a crimped end portion for mating engagement with the recess, whereby the second volume heats while the heat flows into the second volume, whereby the food item cooks while the second volume heats and whereby the upper vessel and the lower vessel are vertically connected while the crimped end portion matingly engages the recess.

According to yet another aspect of the present invention, there is provided a method of manufacturing a stackable cooking apparatus for cooking a food item, the method including: providing a lower vessel having a top wall adapted to support the food item thereon and defining a perforation through the top wall; providing an upper vessel adapted to be mounted atop the lower vessel for substantially surrounding the food item, the upper vessel having a lower end portion; and coupling a handle to the upper vessel for manually lifting the upper vessel away from the lower vessel to allow placement of the food item onto the top wall and to allow retrieval of the food item from the top wall.

A feature of the present invention is the provision of a lower vessel having a top wall adapted to support the food item thereon and defining a perforation through the top wall for flow of heat through the perforation, so that the food item is cooked by the flow of heat.

Another feature of the present invention is the provision of a lower vessel defining a recess in an upper portion thereof and an upper vessel having a crimped end portion for mating engagement with the recess, in order to stabilize a vertical orientation of the lower vessel and the upper vessel.

An additional feature of the present invention is the provision of a plurality of locking assemblies coupled to respective ones of a lower vessel, an intermediate vessel and an upper vessel for releasably interlocking the lower vessel, the intermediate vessel and the upper vessel, so that inadvertent separation of the lower vessel, the intermediate vessel and the upper vessel is avoided.

A further feature of the present invention is the provision of a temperature sensor in heat sensing communication with a cooking chamber defined by the cooking apparatus for continuously sensing temperature in the cooking chamber to properly cook the food item.

Yet another feature of the present invention is the provision of an insulation wrap surrounding at least one of the upper vessel and the lower vessel and disposed on the top wall of the upper vessel for reducing heat loss therefrom.

Still another feature of the present invention is the provision of a heat conducting platform adapted to be disposed inside the upper vessel for supporting the food item thereon and for transferring heat to the food item while the platform supports the food item, in combination with a heat retention body adapted to be disposed adjacent the platform and in heat transfer communication with the platform for gradually releasing stored heat therefrom to the platform.

Another feature of the present invention is the provision of a top wall having perforations arranged in a predetermined pattern to circulate or swirl heated air around the food for more evenly cooking the food item.

In addition to the foregoing, various other method and/or device aspects and features are set forth and described in the teachings, such as text (e.g., claims and/or detailed description) and/or drawings of the present invention.

The foregoing is a summary and thus may contain simplifications, generalizations, inclusions, and/or omissions of detail. Consequently, those skilled in the art will appreciate that the summary is illustrative only and is not intended to be in any way limiting. In addition to the illustrative aspects, embodiments, and features described hereinabove, further aspects, embodiments, and features will become apparent by reference to the drawings and the following detailed description.

BRIEF DESCRIPTION OF THE DRAWINGS

The invention will be more fully understood by reference to the detailed description in conjunction with the following figures, wherein.

DETAILED DESCRIPTION OF PREFERRED EMBODIMENTS

Figure 1:
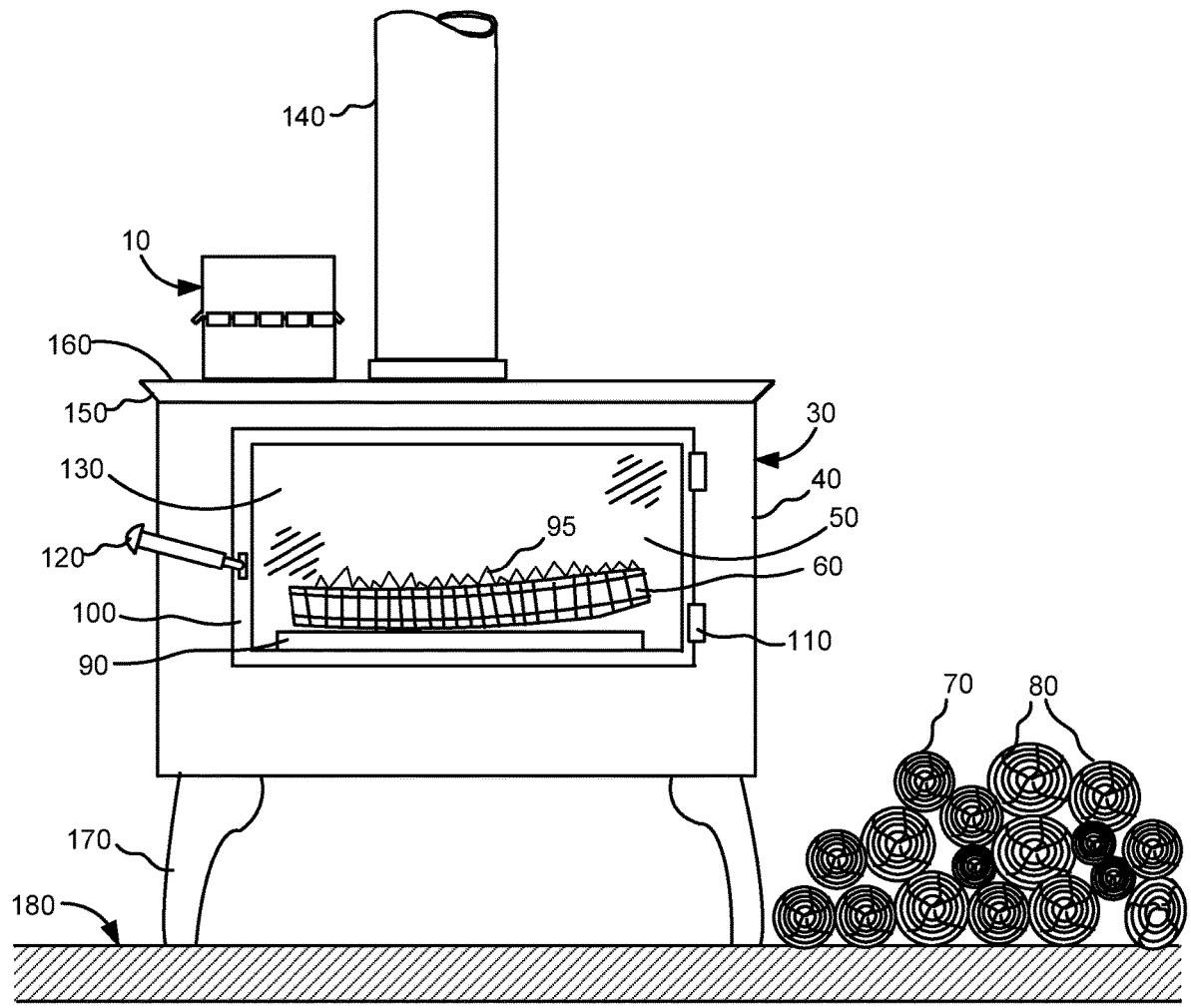
FIG. 1 illustrates a first embodiment stackable cooking apparatus for cooking a food item, the first embodiment stackable cooking apparatus being disposed upon a wood burning stove.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from either the spirit or scope of the invention.

In addition, the present patent specification uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Figure 2:
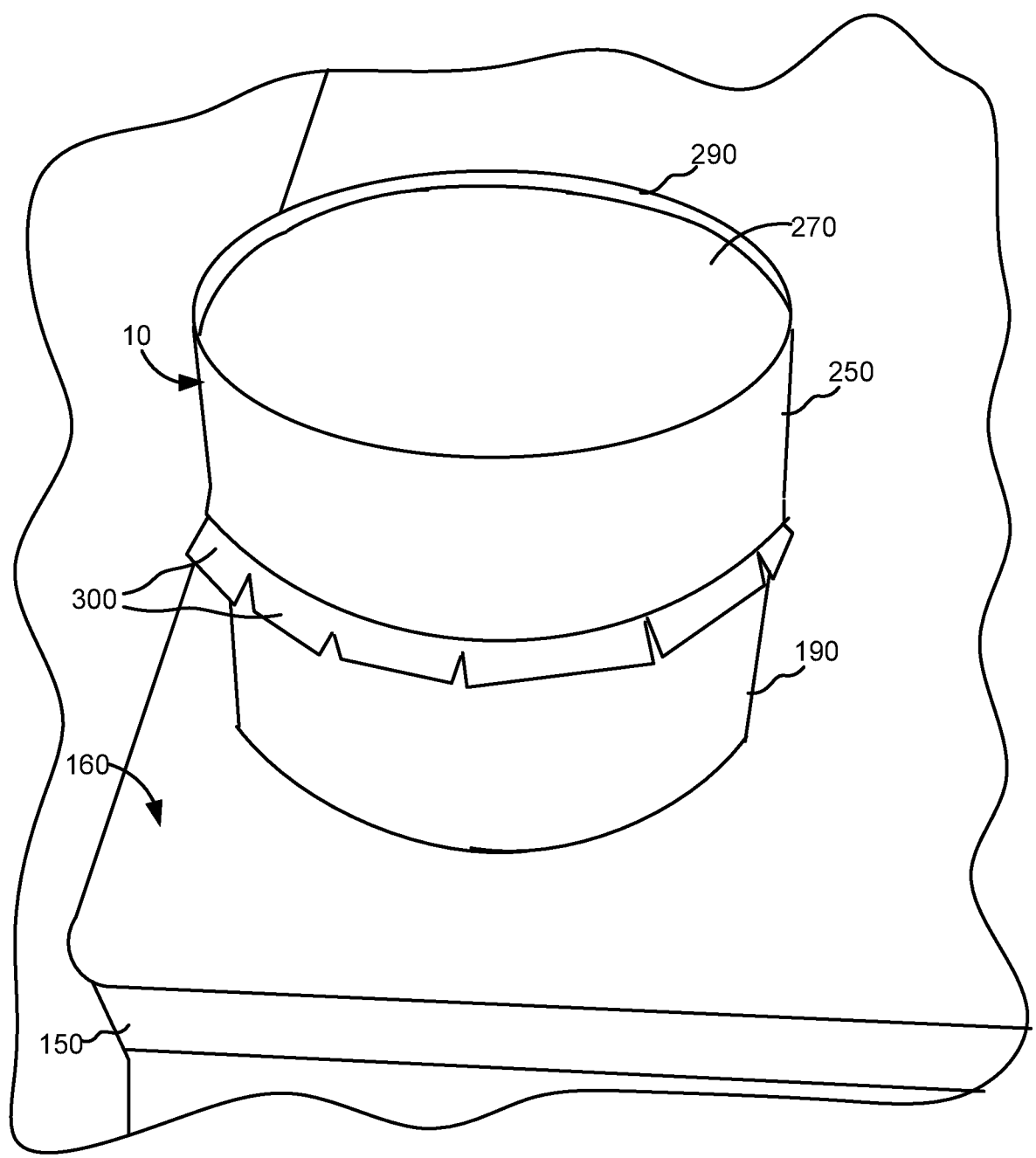
FIG. 2 is a fragmentary view in perspective of the first embodiment stackable cooking apparatus disposed on the top surface of the wood burning stove.
Figure 3:
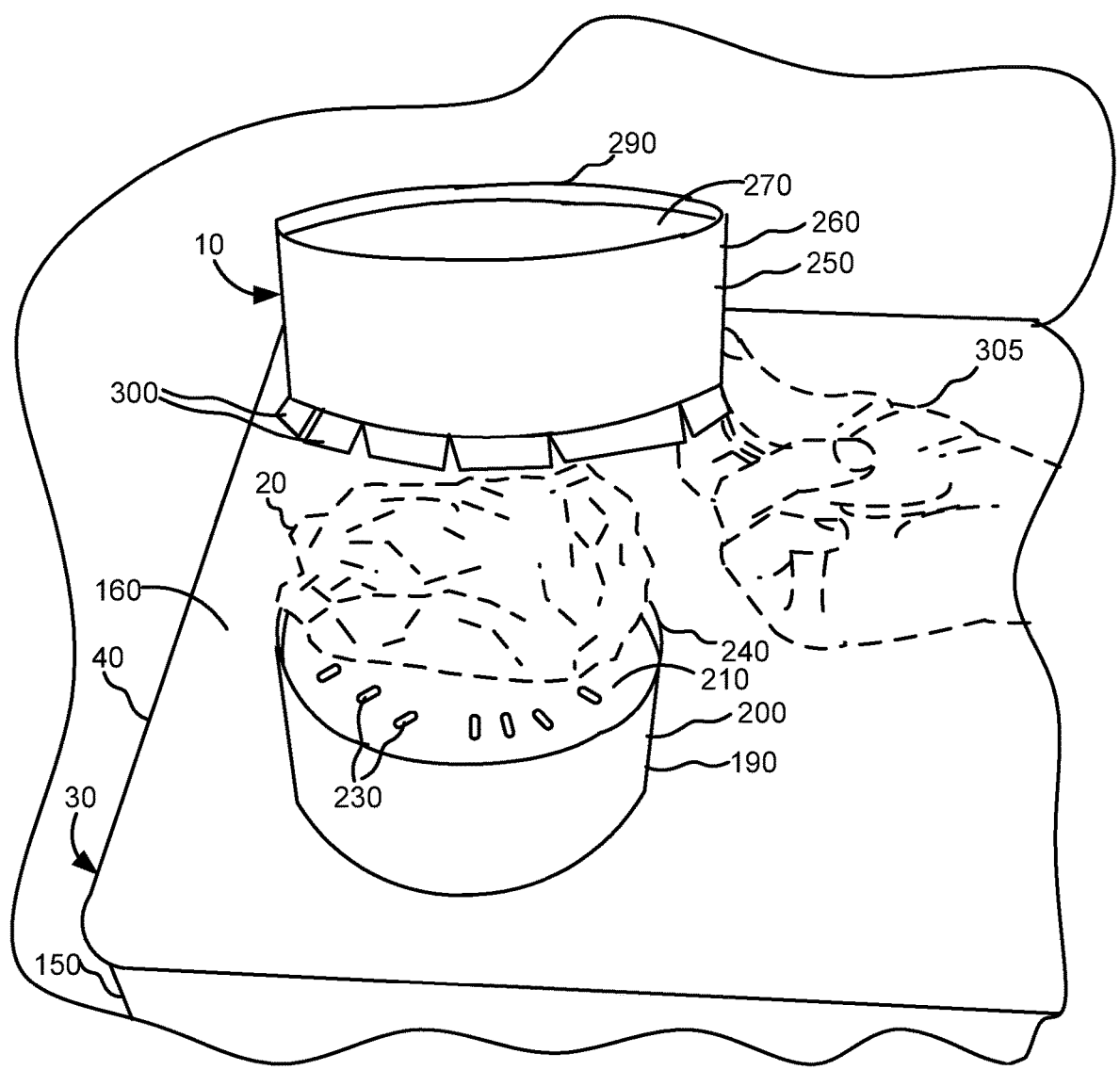
FIG. 3 is a fragmentary view in perspective of an upper vessel belonging to the first embodiment stackable cooking apparatus, the upper vessel being manually lifted from a lower vessel belonging to the first embodiment stackable cooking apparatus.
Figure 4:
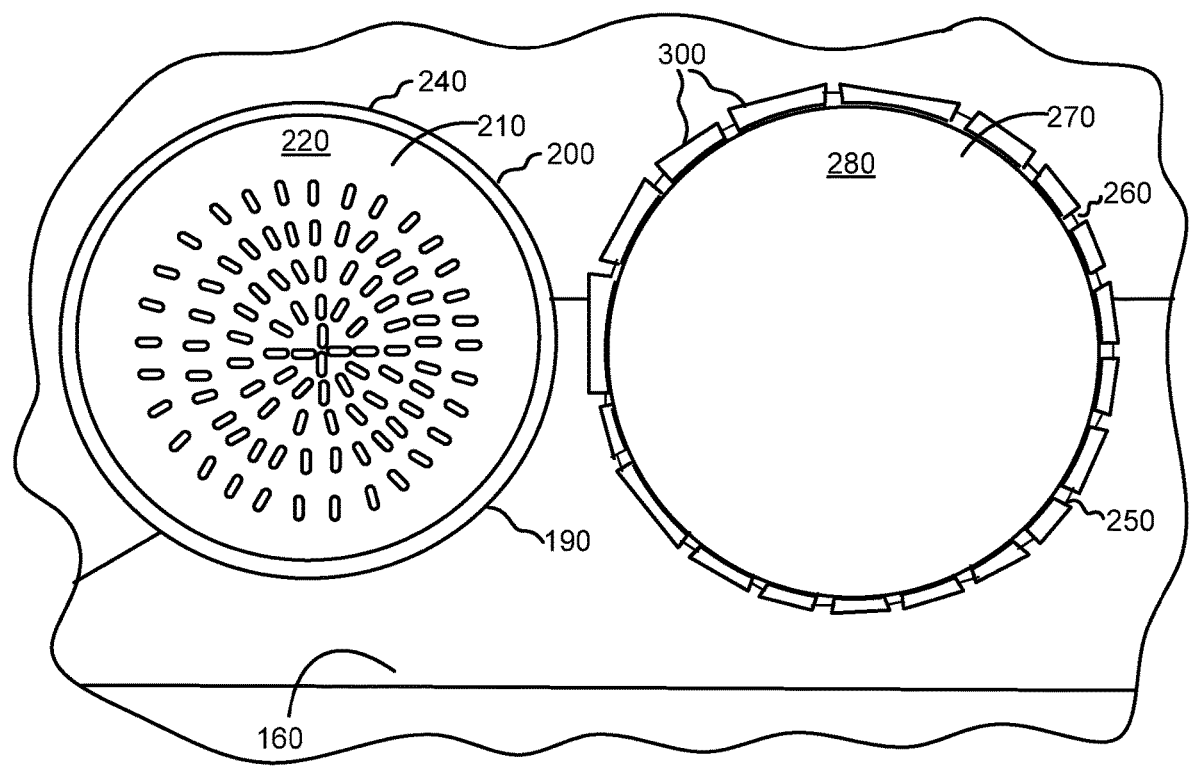
FIG. 4 is a fragmentary view in perspective of the upper vessel belonging to the first embodiment stackable cooking apparatus disposed adjacent to the lower vessel belonging to the first embodiment stackable cooking apparatus, the lower vessel and the upper vessel being oriented to show the open bottom end of the upper vessel and the open bottom end of the lower vessel.
Figure 5:
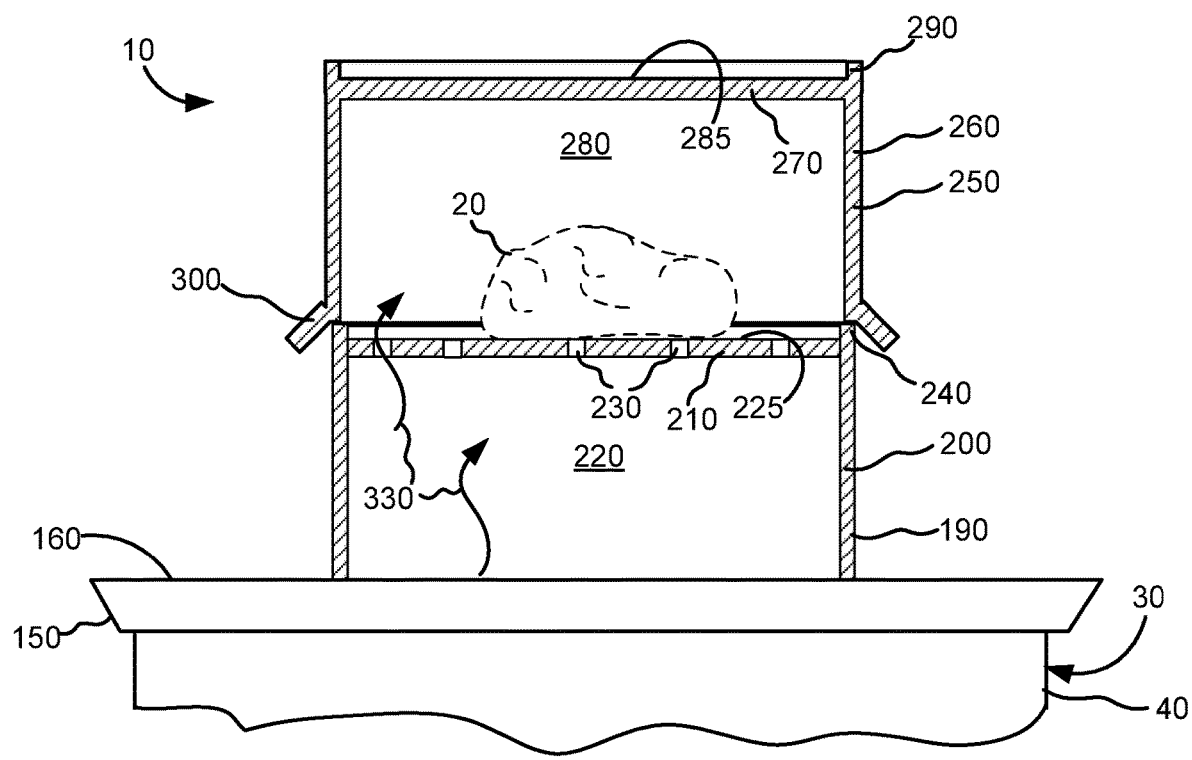
FIG. 5 is a view in vertical section of the first embodiment stackable cooking apparatus, this view showing outwardly bent or crimped gripping members belonging to the upper vessel.

Therefore, with reference to FIGS. 1, 2 and 3, there is shown a first embodiment stackable cooking apparatus, generally referred to as 10, for cooking a food item 20. Food item 20 may be virtually any food item, such as a potato. As described in more detail hereinbelow, first embodiment stackable cooking apparatus 10 (hereinafter referred to as "cooking apparatus 10") is adapted to receive heat from a suitable heat source, such as a wood burning stove, generally referred to as 30. Wood burning stove 30, which forms no part of the present invention, comprises a shell 40 defining a combustion chamber 50 therein for burning a wood log 60 selected from a wood pile 70 that includes a plurality of unburned wood logs 80. Wood log 60 may rest on a base 90 comprising fire brick or a grate disposed in combustion chamber 50 for supporting wood log 60 while wood log 60 burns due to presence of a flame 95. It should be appreciated, however, that combustible materials other than wood logs may be used. For example, the combustible material may be a biomass fuel, such as wood pellets/chips or yard clippings.

Referring again to FIGS. 1, 2 and 3, a door 100, which is openable and closeable by pivoting on a plurality of hinges 110 attached to shell 40, allows placement of unburned wood logs 80 into combustion chamber 50 and retrieval of ashes from combustion chamber 50. In this regard, a handle and latch mechanism 120 are associated with door 100 and shell 40 for opening and closing door 100. A transparent window 130, such as glass, is provided in door 100 for visually monitoring progress of the combustion process occurring in combustion chamber 50. A ventilation pipe 140 is in communication with combustion chamber 50 for ventilating combustion gases from combustion chamber 50 to a chimney (not shown) or flue (also not shown). Fresh air, which promotes the combustion process, is supplied to combustion chamber 50 by means of a damper device (not shown) disposed in ventilation pipe 140. In addition, shell 40 includes a stove top 150 defining a top surface 160 thereon in radiant heat transfer communication with combustion chamber 50 for heating top surface 160. Heated top surface 160 transfers heat to cooking apparatus 10 by means of heat conduction through stove top 150, to top surface 160 and thereafter by radiative heat transfer to cooking apparatus 10. A plurality of support legs 170 is attached to a bottom portion of shell 40 for supporting shell 40 on a horizontal surface 180.

Referring to FIGS. 2, 3, 4 and 5, cooking apparatus 10 comprises a hollow, generally cylindrical lower vessel 190. The lower vessel 190 has a generally cylindrical first sidewall 200 and a generally circular first top wall 210 perpendicular to first sidewall 200 and integrally attached thereto. This configuration of first sidewall 200 and first top wall 210 defines a first space or first volume 220 therebetween. Elevation of first top wall 210 is slightly below an upper end portion of first sidewall 200, so that first top wall 210 and the upper end portion of first sidewall 200 define a first recess 225 therebetween and a raised first perimeter lip 240 circumscribing first recess 225 for reasons provided hereinbelow.

Referring again to FIGS. 2, 3, 4 and 5, first top wall 210 defines a plurality of perforations 230 therethrough for reasons stated hereinbelow. Perforations 230 may be arranged symmetrically, such as in concentric circles as shown or other predetermined arrangement. The arrangement of perforations 230, such as the illustrated symmetrical arrangement of perforations 230, is selected such that perforations 230 will tend to circulate or swirl heated air around food item 20 for more evenly cooking food item 20, without use of fans, in a manner disclosed hereinbelow.

Referring yet again to FIGS. 2, 3, 4 and 5, cooking apparatus 10 further comprises a hollow, generally cylindrical upper vessel 240 that is adapted to be coaxially mounted atop lower vessel 190. Upper vessel 240 has a generally cylindrical second sidewall 260 and a generally circular second top wall 270 perpendicular to second sidewall 260 and integrally attached thereto. This configuration of second sidewall 260 and second top wall 270 defines a second space or second volume 280 therebetween. Second volume 280 will substantially surround food item 20 when food item 20 is disposed on first top wall 210 and when upper vessel 250 is coaxially aligned with and mounted atop lower vessel 190. Elevation of second top wall 270 is slightly below an upper end portion of second sidewall 260, so that second top wall 270 and the upper end portion of second sidewall 260 define a second recess 285 therebetween and a second perimeter lip 290 therearound, so that another food item (not shown) may be positioned on second top wall 270 for cooking (e.g., frying) the another food item, if desired. In this manner, cooking apparatus 10 can alternatively function as a combination oven and fryer. Lower vessel 190 and upper vessel 250 may be manufactured from any suitable heat-conducting material, such as, without limitation, steel, aluminum, cast iron, glass, ceramic, glass-ceramic or the like.

Referring to FIGS. 2, 3, 4, 5, 6 and 7, upper vessel 250 has an outwardly bent or crimped lower end portion in the configuration of a plurality of outwardly projecting gripping members 300 extending around a perimeter of the lower end portion of upper vessel 250. Gripping members 300 enable a user 305 of cooking apparatus 10 to grip gripping members 300 and manually lift upper vessel 250 away from lower vessel 190 in order to dispose food item 20 on first top wall 210 before cooking and to retrieve food item 20 from first top wall 210 during or after cooking. In addition, when upper vessel 250 is mounted atop lower vessel 190, outwardly projecting gripping members 300 will rest on first perimeter lip 240 for centering and vertically stabilizing upper vessel 250 on lower vessel 190. In other words, gripping members 300 function as an obstruction to lateral displacement of upper vessel 250 with respect to lower vessel 190 in order to center and vertically stabilize upper vessel 250 on lower vessel 190.

Figure 6:
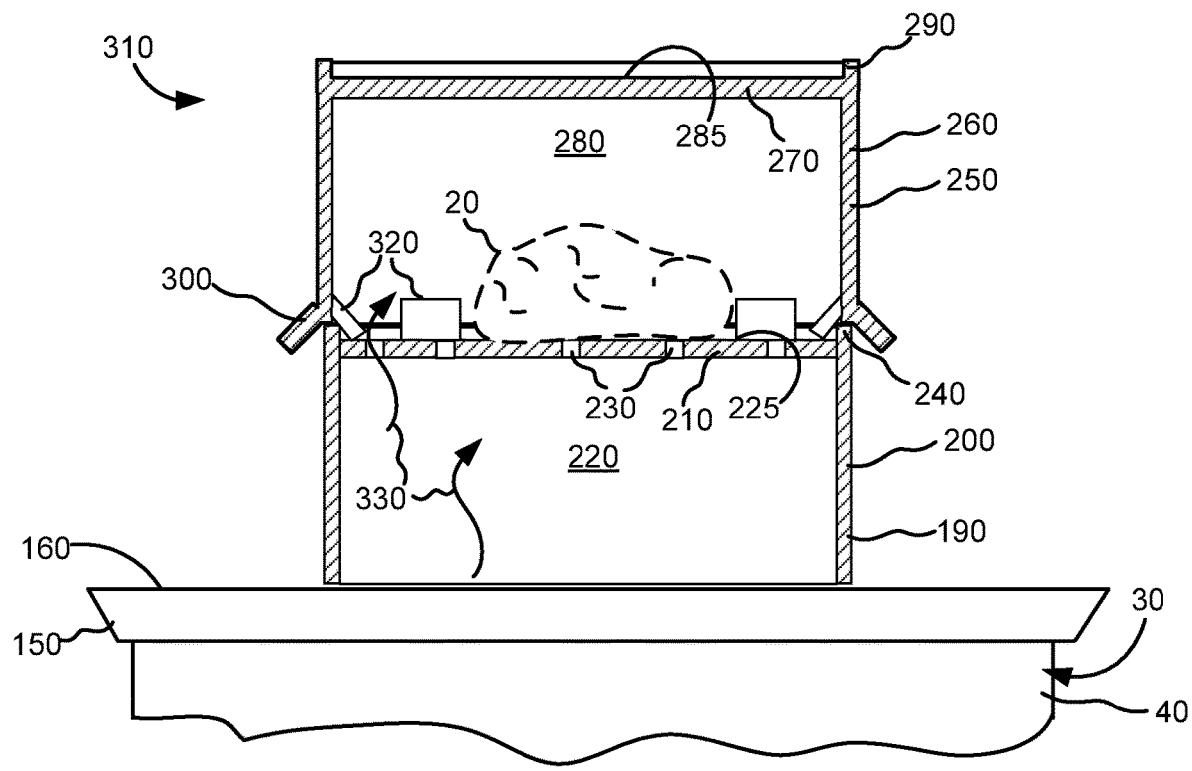
FIG. 6 is a view in vertical section of an alternative configuration of the first embodiment stackable cooking apparatus, this view showing the outwardly bent or crimped gripping members in combination with inwardly bent or crimped gripping members.
Figure 7:
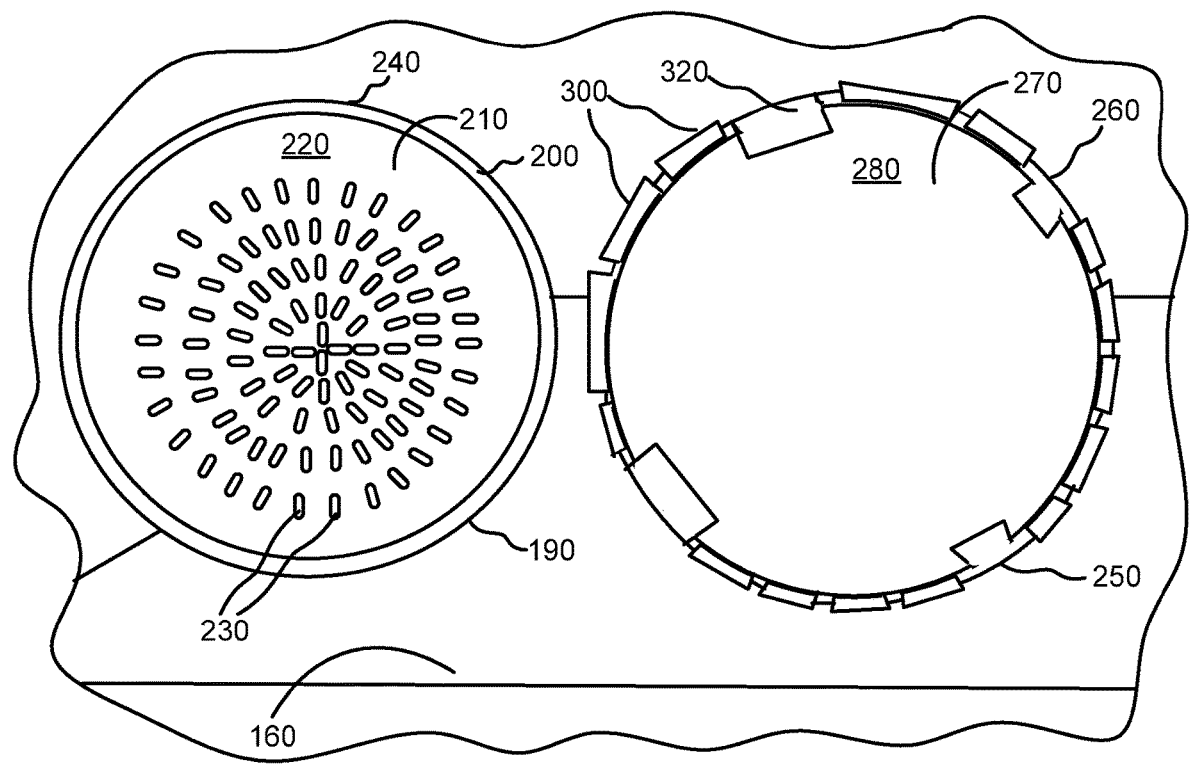
FIG. 7 is a view in perspective of the alternative configuration of the first embodiment stackable cooking apparatus, this view showing the upper vessel belonging to the alternative configuration of the first embodiment stackable cooking apparatus disposed adjacent to the lower vessel belonging to the alternative configuration of the first embodiment stackable cooking apparatus, the lower vessel and the upper vessel being oriented to show the open bottom end of the upper vessel and the open bottom end of the lower vessel, the bottom end of the upper vessel having the outwardly bent or crimped gripping members in combination with the inwardly bent or crimped gripping members.

Referring to FIGS. 6 and 7, there is shown an alternative configuration, generally referred as 310, of first embodiment stackable cooking apparatus 10. Alternative configuration 310 comprises the previously mentioned plurality of outwardly bent or crimped gripping members 300 in combination with a plurality of adjacent inwardly bent or crimped gripping members 320. The plurality of gripping members 320 will inwardly project into previously mentioned first recess 225 for centering and vertically stabilizing upper vessel 250 on lower vessel 190 by creating an obstruction to lateral displacement of upper vessel 250 with respect to lower vessel 190. Alternative configuration 310 is presented herein as another means for centering and vertically stabilizing upper vessel 250 on lower vessel 190.

Referring to FIGS. 1, 3, 5, 6 and 7, use of cooking apparatus 10 and alternative configuration 310 to cook food item 20 will now be described. In this regard, combustion of wood log 60 produces flame 95 that warms combustion chamber 50 to an elevated temperature, which may be between about 100° F. and about 400° F., depending on the temperature of ambient air, type of wood or other fuel being burned and depending on configuration of stove 30 (e.g., thickness of shell 40) and the material composition of stove 30. Heat produced by flame 95 is transferred by radiative heat transfer to stove top 150 that, in turn, heats top surface 160 of stove top 150 by means of conductive heat transfer through stove top 150.

Referring again to FIGS. 1, 3, 5, 6 and 7, lower vessel 190 belonging to cooking apparatus 10 is disposed on top surface 160, such that first volume 220 is in heat transfer communication with top surface 160. The heat from top surface 160 is transferred substantially by a combination of radiative and convective (without fans) heat transfer therefrom and into first volume 220 that is defined by lower vessel 190. The air in first volume 220 heats as heat from top surface 160 enters first volume 220. The heated air in first volume 220 will travel upwardly so that heat is transferred by convective heat transfer from first volume 220 and through symmetrically arranged perforations 230. Perforations 230 are arranged in a predetermined pattern, such as symmetrical concentric circles or spaced-apart parallel lines, to circulate or swirl heated air around food item 20 for more evenly cooking food item 20 without use of fans. In this manner, the heat in first volume 220 will flow along a plurality of heat flow paths 330 extending through perforations 230 (only two heat flow paths 330 are shown). The heat will also pass through first top wall 210 and into second volume 280 by means of conductive heat transfer. Thus, second volume 280 will heat to cook food item 20 due to the convective and conductive heat transfer mentioned immediately hereinabove. After use of cooking apparatus 10, the heat in first volume 220 and second volume 280 will eventually depart therefrom substantially by conductive heat transfer through first sidewall 200, second sidewall 260 and second top wall 270.

Figure 8:
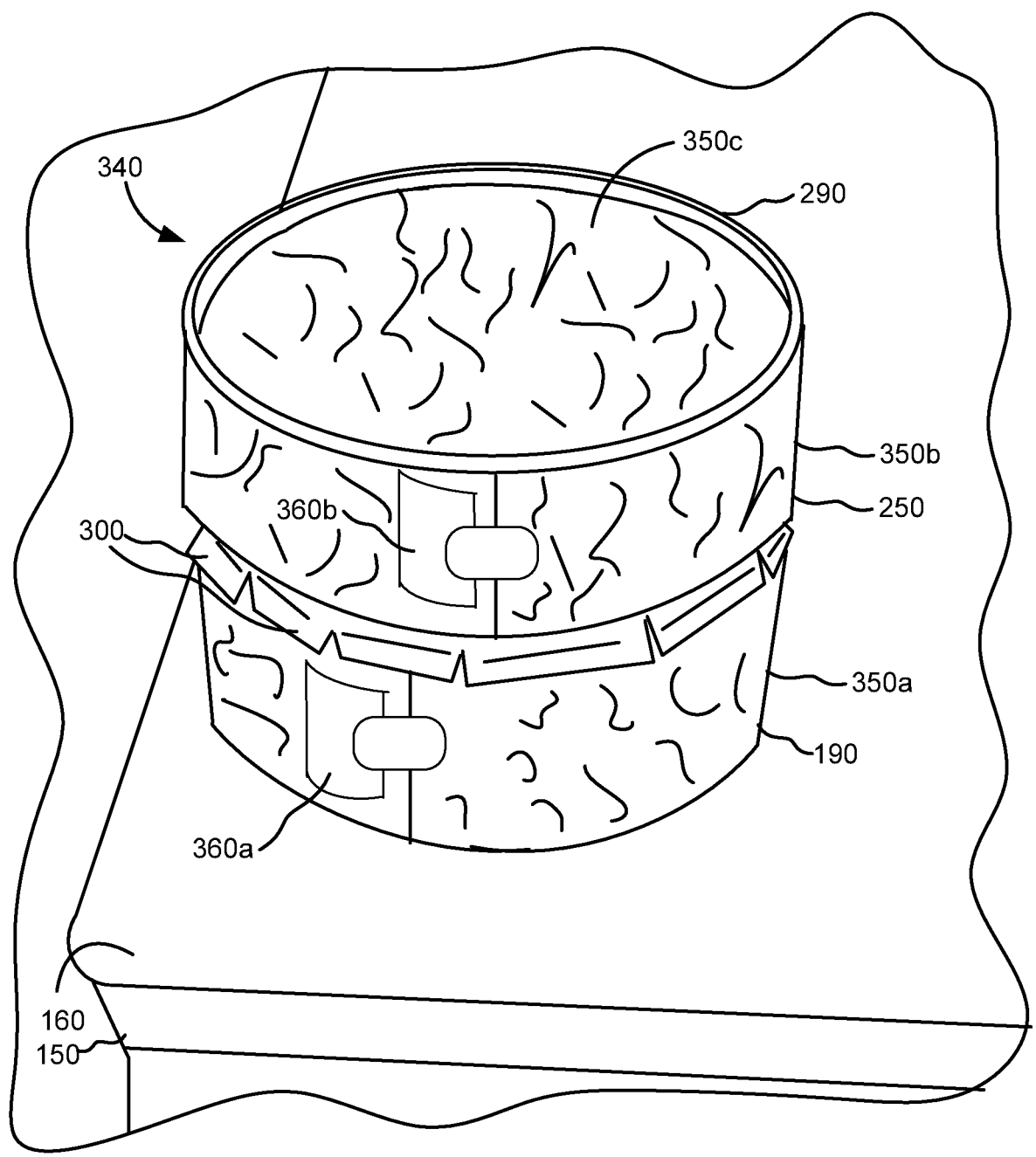
FIG. 8 is a view in perspective of a second embodiment stackable cooking apparatus including an upper vessel and a lower vessel, the second embodiment including a first insulation wrap surrounding a first sidewall belonging to the upper vessel, a second insulation wrap surrounding a second sidewall belonging to the lower vessel and a third insulation wrap disposed on a top wall belonging to the upper vessel.
Figure 9:
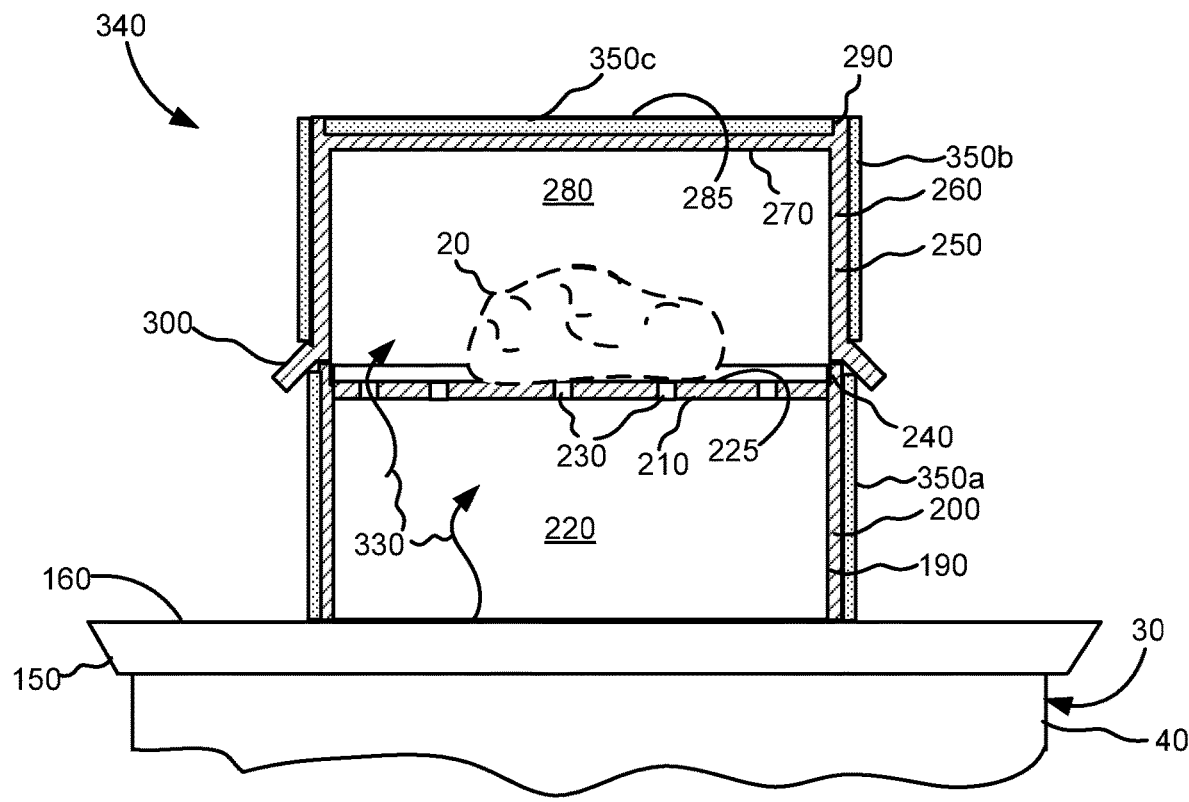
FIG. 9 is a view in vertical section of the second embodiment stackable cooking apparatus.

Referring to FIGS. 8 and 9, there is shown a second embodiment stackable cooking apparatus, generally referred to as 340, for cooking food item 20. Second embodiment stackable cooking apparatus 340 (hereafter referred to as "cooking apparatus 340") is substantially similar to cooking apparatus 10, except a plurality of non-flammable, non-toxic, and flexible insulation wraps 350a, 350b and 350c are releasably secured to an exterior of lower vessel 190, upper vessel 250 and second top wall 270, respectively. Insulation wraps 350a, 350b and 350c are preferably releasably secured to lower vessel 190, upper vessel 250 and second top wall 270, so that insulation wraps 350a, 350b and 350c may be connected to lower vessel 190, upper vessel 250 and second top wall 270 when desired for increasing heating efficiency and removed therefrom when not desired. In this regard, insulation wraps 350a, 350b and 350c are preferably flexible for easily, manually installing insulation wraps 350a, 350b and 350c on lower vessel 190, upper vessel 250 and second top wall 270, respectively, and for easily, manually uninstalling insulation wraps 350a, 350b and 350c therefrom. To obtain this result, insulation wrap 350a includes a first latch assembly 360a for releasably securing insulation wrap 350a to first sidewall 200 of lower vessel 190 and insulation wrap 350b includes a second latch assembly 360b for releasably securing insulation wrap 350b to second sidewall 260 of upper vessel 250. Insulation wrap 350c is simply laid upon the exterior of second top wall 270. Alternatively, insulation wraps 350a/350b/350c may be permanently secured to first sidewall 200, second sidewall 260 and second top wall 270, respectively, by means of a suitable heat-resistant adhesive composition during or after manufacture of cooking apparatus 340. As well known in the art of adhesive manufacture, such a heat-resistant adhesive composition can comprise an ultraviolet (UV) cross-linkable acrylic. More specifically, prior to coating insulation wraps 350a, 350b and 350c, the UV acrylic is melted. The UV acrylic is then cross-linked with UV radiation after coating. A photoinitiator (e.g., benzoyl peroxide) present in the UV acrylic begins the cross-linking chemical reaction in order to obtain adhesive properties. When insulation wraps 350a/350b/350c are permanently secured to first sidewall 200, second sidewall 260 and second top wall 270, presence of latch assemblies 360a and 360b is not required because insulation wraps 350a/350b/350c are not intended to be removable.

Referring again to FIGS. 8 and 9, it should be appreciated from the teachings hereinabove, that presence of insulation wraps 350a/350b/350c increases thermal operating efficiency of cooking apparatus 340. This is so because insulation wraps 350a/350b/350c thermally insulate cooking apparatus 340 to reduce conductive heat transfer out of cooking apparatus 340. Increasing thermal efficiency in this manner allows cooking apparatus 340 to cook food item 20 in less time and assists in keeping food item 20 warm after cooking.

Referring yet again to FIGS. 8 and 9, insulation wraps 350a/350b/350c may comprise any suitable non-flammable and non-toxic material. In this regard, such a material can be a commercially available flame-resistant, non-toxic fabric known as "NOMAX™", which may be available from E. I. du Pont de Nemours and Company located in Wilmington, Del., U.S.A. "NOMAX" includes, at least in part, a paper formed as a honeycomb structure and saturated with a phenolic resin. Although asbestos has flame-retardant properties, asbestos is not desirable for use as insulation wraps for cooking apparatus 340 when preparing food item 20 for human consumption because of its carcinogenic effect in humans.

Figure 10:
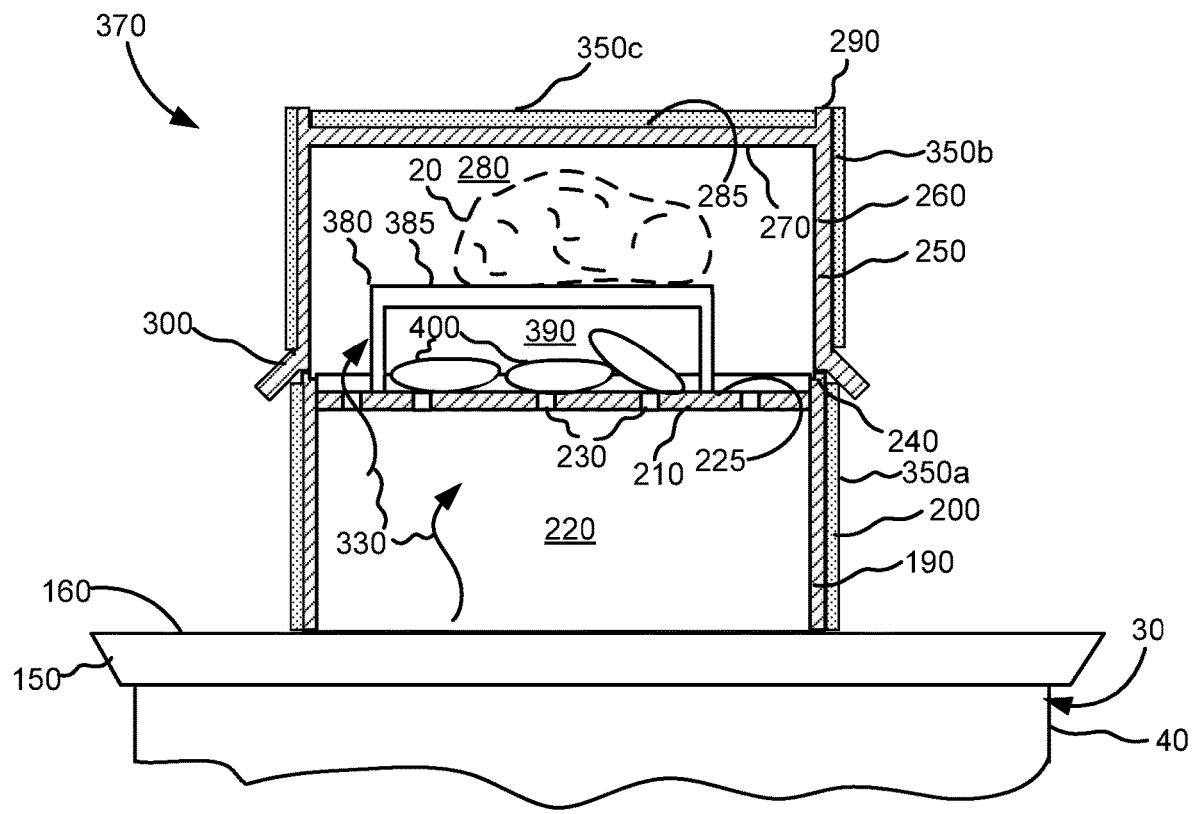
FIG. 10 is a view in vertical section of a third embodiment stackable cooking apparatus including an upper vessel and a lower vessel, this view showing a heat conducting platform disposed in the upper vessel and supporting the food item, the third embodiment also including at least one heat retention body disposed adjacent the platform.

Referring to FIG. 10, there is shown a third embodiment stackable cooking apparatus, generally referred to as 370, for cooking food item 20. Third embodiment cooking apparatus 370 (hereinafter referred to as "cooking apparatus 370") is substantially similar to cooking apparatus 340, except a heat conducting platform 380, defining a support surface 350 for supporting food item 20 thereon, is disposed on previously mentioned first top wall 210. Platform 380 and first top wall 210 cooperatively define a space 390 therebetween for receiving at least one heat retention body 400, such that heat retention body 400 will be disposed adjacent platform 360 while heat retention body 400 resides within space 390. Heat retention body 400 absorbs and temporarily stores heat and thereafter gradually releases the stored heat therefrom to platform 360 for heating platform 360. The heat gradually released from heat retention body 400 and received by platform 360 is conducted through platform 360 to food item 20 when cooking apparatus 370 is removed from previously mentioned wood burning stove 30. Heat retention body 400 may comprise any suitable heat retaining material, such as, without limitation, basalt rock. The basalt rock, which is an extrusive igneous (i.e., volcanic) rock, will retain heat longer due to its denser composition compared to many other types of minerals. However, another mineral suitable for this purpose includes zeolites (i.e., aluminosilicates). A purpose for using heat retention body is to release its stored heat over time, so that food item 20 is kept warm even when no longer receiving heat from previously mentioned wood burning stove 30. This feature of the invention is useful, for example, when it is desired to use cooking apparatus 370 to cook food item 20 and then use cooking apparatus 370 to transport food item 20 to an outdoor picnic area or other dining area while keeping food item 20 warm.

Figure 11:
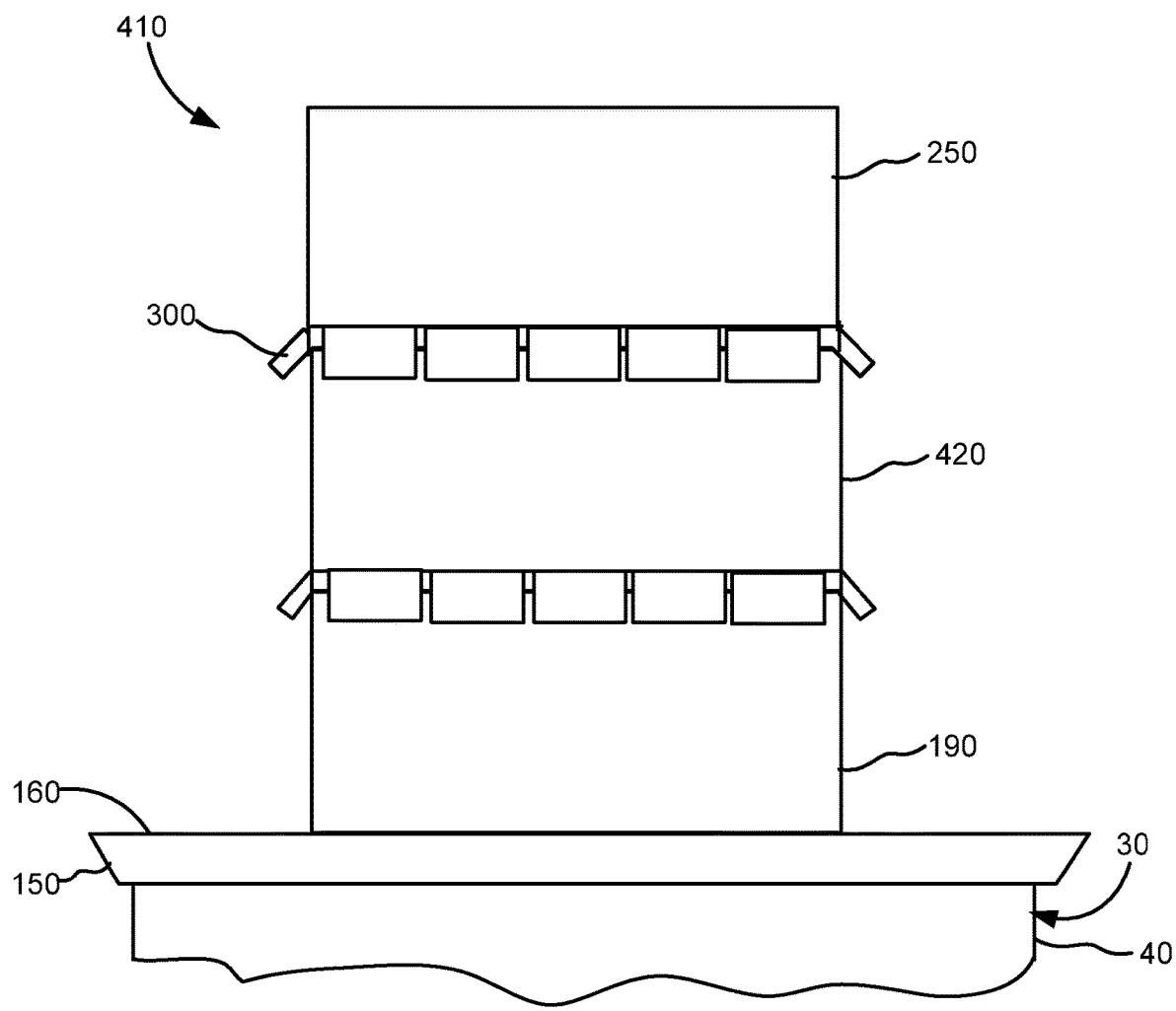
FIG. 11 is a view in elevation of a fourth embodiment stackable cooking apparatus, the fourth embodiment stackable cooking apparatus including an intermediate vessel interposed between the upper vessel and the lower vessel.
Figure 12:
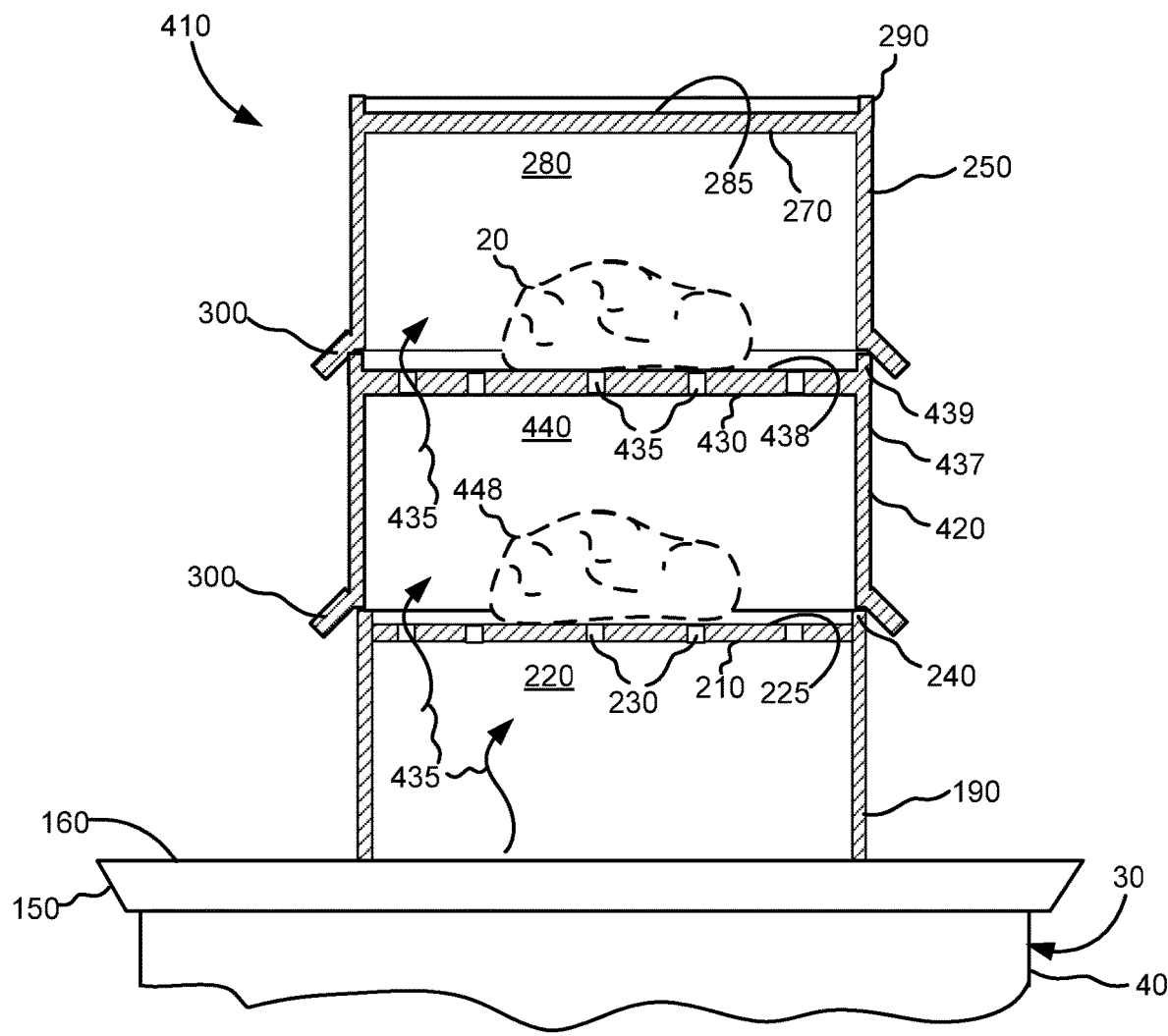
FIG. 12 is a view in vertical section of the fourth embodiment stackable cooking apparatus.

Turning now to FIGS. 11 and 12, there is shown a fourth embodiment stackable cooking apparatus, generally referred to as 410, for cooking food item 20. Fourth embodiment stackable cooking apparatus 410 (hereinafter referred to as "cooking apparatus 410") comprises previously mentioned lower vessel 190 and upper vessel 250. However, interposed between lower vessel 190 and upper vessel 250 is an intermediate vessel 420 having a configuration substantially similar to lower vessel 190, except that intermediate vessel 420 includes previously mentioned gripping members 300 formed in a bottom portion of intermediate vessel 420. Although only one intermediate vessel 420 is shown, it should be appreciated that virtually any number of intermediate vessels may be interposed between lower vessel 190 and upper vessel 250 in order to simultaneously cook a plurality of food items. Intermediate vessel 420 includes a perforate third top wall 430 having a plurality of previously mentioned perforations 230 for allowing convective heat transfer therethrough and into a third cooking chamber or third volume 440 without use of fans. The third volume 440 is defined by third top wall 430 and a generally cylindrical third sidewall 437 perpendicular to third top wall 430 and integrally connected thereto. That is, heat transfer will flow along a plurality of convective heat transfer flow paths 435 (only three heat transfer flow paths 435 are shown) extending from lower vessel 190, through first perforate top wall 210 of lower vessel 190 to heat another food item 448 disposed on perforate first top wall 210 of lower vessel 190. The heat thereafter flows into third volume 440 defined by intermediate vessel 420, through perforate third top wall 430 of intermediate vessel 420 and into volume 280 to heat previously mentioned food item 20 that will have been disposed on perforate third top wall 430 of intermediate vessel 420. In addition, elevation of third top wall 430 is slightly below an upper end portion of third sidewall 430, so that third top wall 430 and the upper end portion of third sidewall 437 define a third recess 438 therebetween and a raised third perimeter lip 439 circumscribing third recess 438 for reasons provided hereinbelow. Thus, it should be appreciated that when food item 448 is disposed on perforate first top wall 210 of lower vessel 190, the food item 448 is disposed within third volume 440 of intermediate vessel 420. Also, when food item 20 is disposed on perforate third top wall 430 of intermediate vessel 420, the food item 20 is disposed within second volume 280 of upper vessel 250. This configuration of the invention allows simultaneous cooking of more than one food item. That is, one food item 448 is cooked while disposed within third volume 440 of intermediate vessel 420 and another food item 20 is simultaneously cooked while disposed within second volume 280 of upper vessel 250. Simultaneously cooking multiple food items reduces time required for preparation of a complete meal.

Figure 13:
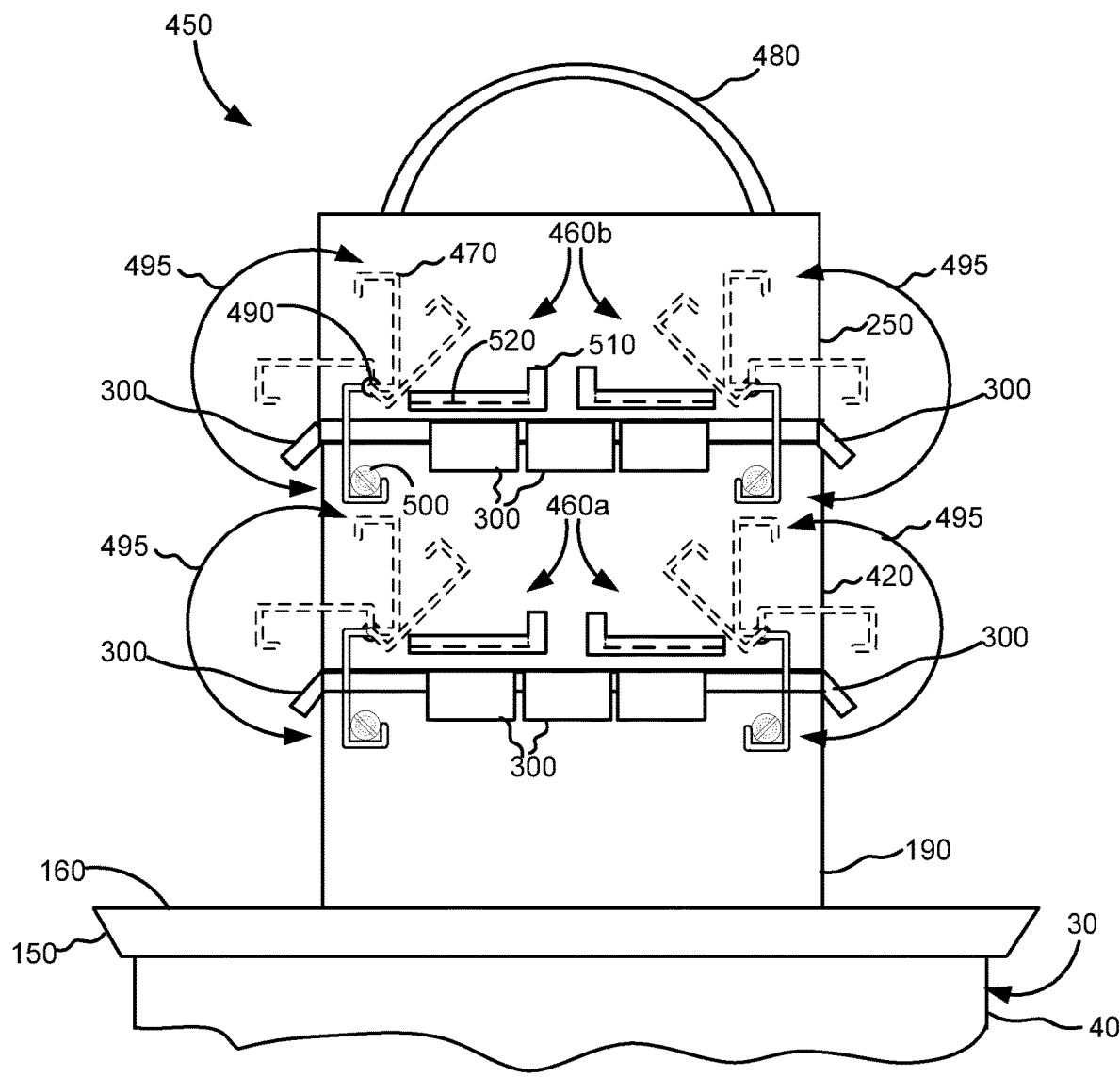
FIG. 13 is a view in elevation of a fifth embodiment stackable cooking apparatus including a plurality of locking assemblies coupled to respective ones of an upper vessel, an intermediate vessel and a lower vessel belonging to the fifth embodiment stackable cooking apparatus.

As best seen in FIG. 13, there is shown a fifth embodiment stackable cooking apparatus, generally referred to as 450. Fifth embodiment stackable cooking apparatus (hereinafter referred to as "cooking apparatus 450") is substantially similar to cooking apparatus 410, except a plurality of locking assemblies, such as locking assemblies 460a and 460b, are coupled to respective ones of intermediate vessel 420 and upper vessel 250. A purpose of locking assemblies 460a/460b is to reduce the risk that upper vessel 250, intermediate vessel 420 and lower vessel 189 will separate if inadvertently "bumped" or impacted during the cooking process. Also, locking assemblies 460a/460b, in combination with a handle 480 attached to second top wall 270, allow cooking apparatus 450 to be conveniently portable to a dining area as a single unit rather than requiring that each of vessels 190/429/250 be separately transported to the dining area.

Referring again to FIG. 13, each locking assembly 460a and 460b includes a locking arm 470 adapted to be manually pivoted or rotated about a pivot pin 490, generally in an arc 495. Each of intermediate vessel 420 and upper vessel 250 has pivot pin 490 attached thereto. In vertical alignment with each pivot pin 490 is a corresponding catch 500 that is attached to an adjacent vessel, such as intermediate vessel 420 or lower vessel 190, as the case may be. For example, pivot pin 490 that is attached to upper vessel 250 has a corresponding catch 500 in vertical alignment therewith, the catch 500 being attached to intermediate vessel 420. Moreover, a cradle or locking arm holder 510 is disposed laterally adjacent to each pivot pin 490 to which locking arm 470 is pivotally connected. A purpose of locking arm holder 510 is to provide means for resting, holding or stowing locking arm 470 when the corresponding locking arms 470 are not being used to interlock vessels 190/420/250. For this reason, each locking arm holder 510 defines a recess 520 therein for receiving its corresponding locking arm 470, which can be manually rotated about pivot pin 490, so as to engage and disengage recess 520.

Figure 14:
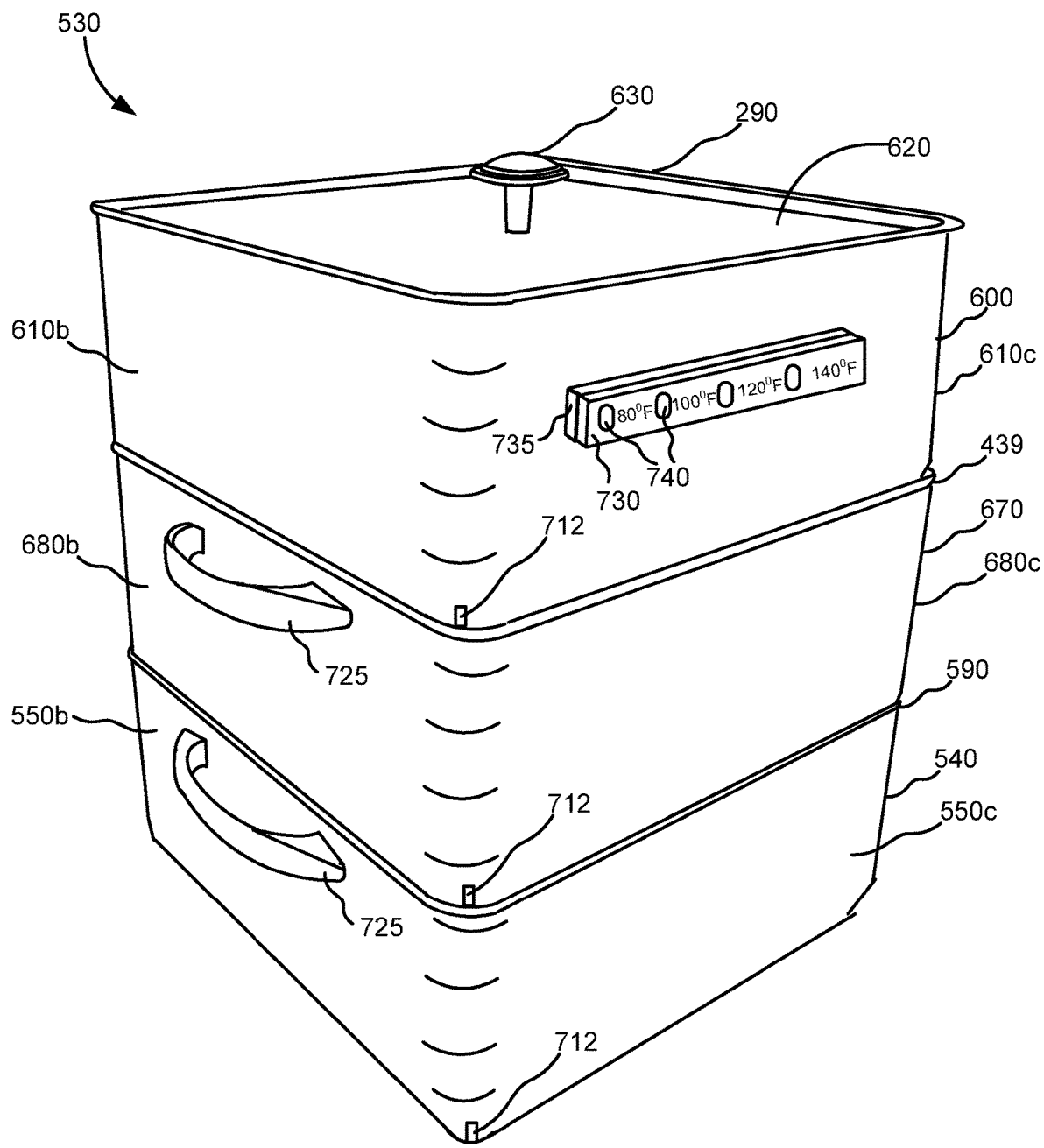
FIG. 14 is a view in perspective of a sixth embodiment stackable cooking apparatus including an upper vessel, a lower vessel and an intermediate vessel interposed between the upper vessel and the lower vessel, this view also showing a temperature sensing device in the form of a temperature label adhesively coupled to the upper vessel.
Figure 15:
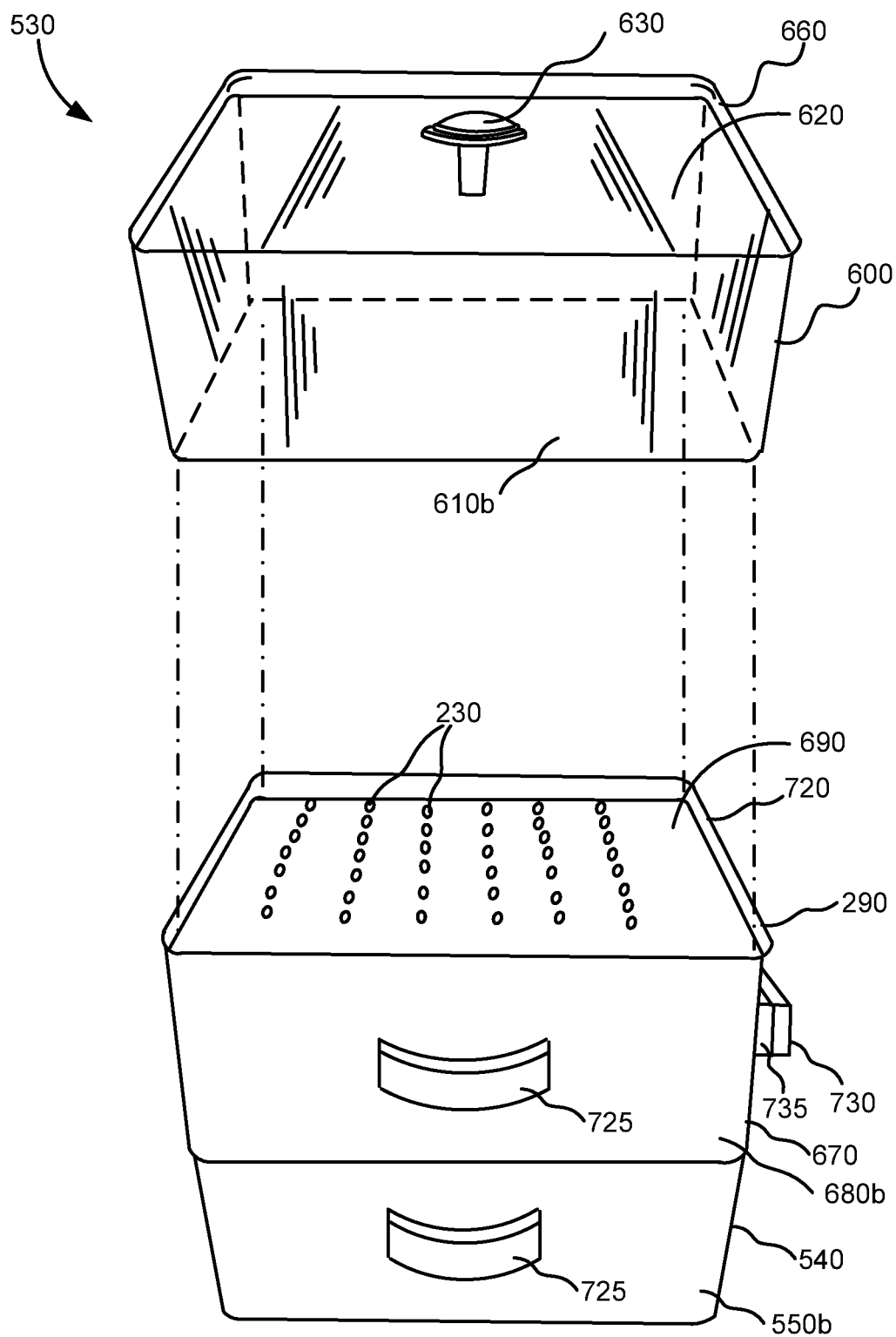
FIG. 15 is a partially exploded view in perspective of the sixth embodiment stackable cooking apparatus including an upper vessel, a lower vessel and an intermediate vessel interposed between the upper vessel and the lower vessel, this view also showing the upper vessel vertically aligned with the intermediate vessel.
Figure 16:
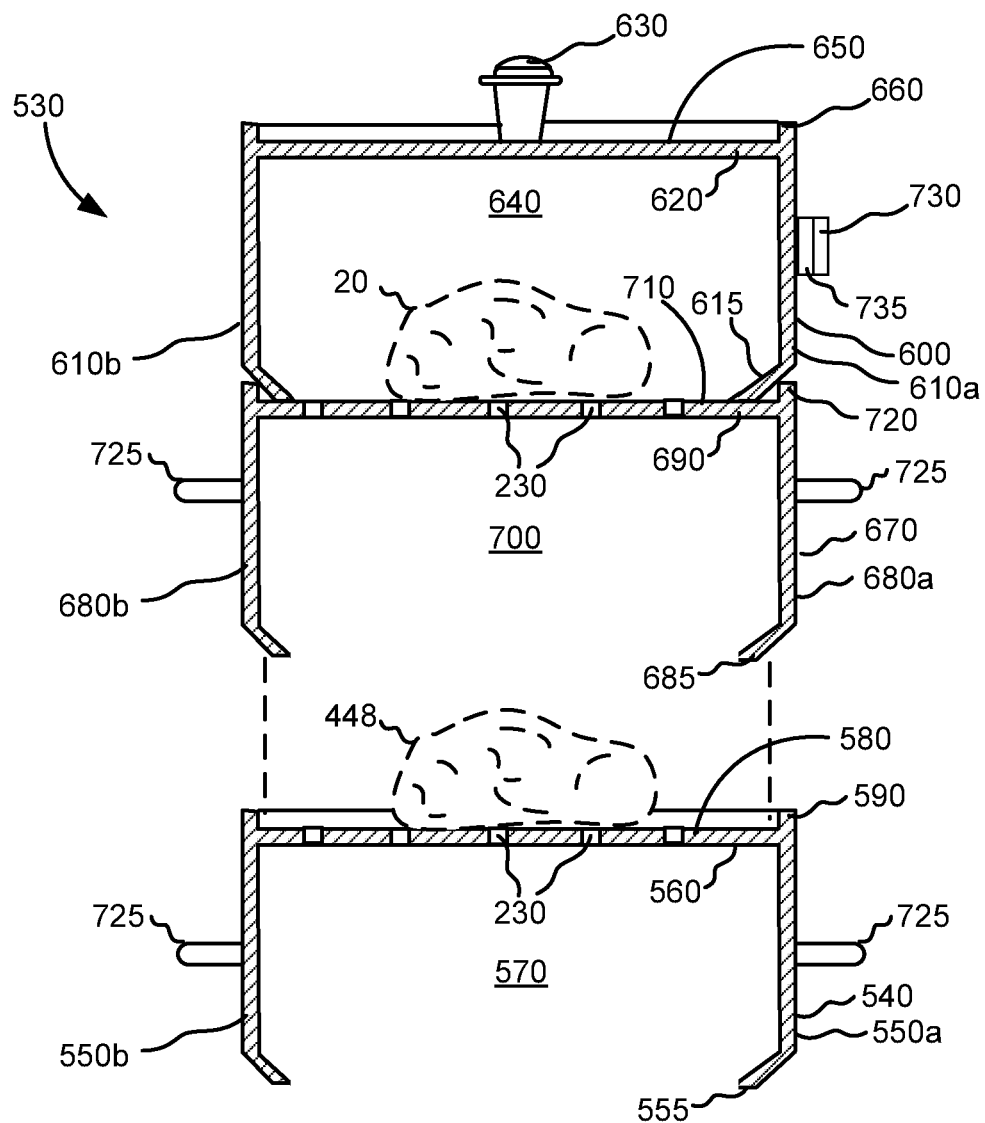
FIG. 16 is a view in vertical section of the sixth embodiment stackable cooking apparatus.

With respect to FIGS. 14, 15 and 16, a sixth embodiment stackable cooking apparatus, generally referred to as 530, comprises a hollow, generally parallelepiped-shaped lower vessel 540. Lower vessel 540 has a first right sidewall 550a and a first left sidewall 550b parallel to first right sidewall 550a. Also, lower vessel 540 has a first front sidewall 550c and a first rear sidewall (not shown) parallel to first front sidewall 550c. First right sidewall 550a and first left sidewall 550b are perpendicular to first front sidewall 550c and the first rear sidewall. In addition, lower vessel 540 defines an open first bottom edge or bottom end portion 555. A horizontal, generally planar first top wall 560 is integrally connected to sidewalls 550a/b/c and the rear sidewall. Previously mentioned perforations 230 are formed through first top wall 560 for convective heat transfer therethrough. This configuration of first sidewalls 550a/b/c and the first rear sidewall in combination with first top wall 560 define a first space or first volume 570 therebetween. Elevation of first top wall 560 is slightly below an upper end portion of first sidewalls 550a/b/c and the first rear sidewall, so that first top wall 560 and the upper end portion of first sidewalls 550a/b/c and the first rear sidewall define a first recess 580 therebetween and also define a raised first perimeter lip 590 extending around recess 580 for reasons provided hereinbelow. First top wall 560 defines the previously mentioned plurality of perforations 230 therethrough for reasons stated hereinabove. Perforations 230 may be arranged in a predetermined pattern, such as in a plurality of parallel lines, for the reasons previously discussed. Thus, it is appreciated that configuration of cooking apparatus 530 is similar to configuration of cooking apparatus 10 to the extent that cooking apparatus 530 is presented in the general shape of a parallelepiped rather being generally cylindrically shaped.

Referring again to FIGS. 14, 15 and 16, cooking apparatus 530 further comprises a hollow, generally parallelepiped-shaped upper vessel 600 that is adapted to be coaxially aligned with lower vessel 540. Upper vessel 600 has a second right sidewall 61Oa and a second left sidewall 61Ob parallel to second right sidewall 610a. Also, upper vessel 600 has a second front sidewall 610c and a second rear sidewall (not shown) parallel to second front sidewall 61Oc. Second right sidewall 61Oa and second left sidewall 61Ob are perpendicular to second front sidewall 61Oc and the second rear sidewall. In addition, upper vessel 600 defines an open second bottom edge or bottom end portion 615. A horizontal, generally planar second top wall 620 is integrally connected to second sidewalls 61Oa/b/c and the second rear sidewall. An upright handle 630 is attached to upper vessel 600 for manually manipulating upper vessel 600, so as to manually upwardly lift and downwardly lower upper vessel 600 for reasons provided hereinbelow. The configuration of second sidewalls 61Oa/b/c and the second rear sidewall in combination with second top wall 620 define a second space or second volume 640 therebetween. Elevation of second top wall 620 is slightly below an upper end portion of second sidewalls 61Oa/b/c and the second rear sidewall, so that second top wall 560 and the upper end portion of second sidewalls 61Oa/b/c and the second rear sidewall define a second recess 650 therebetween and also defines a raised second perimeter lip 660 extending around second recess 650.

Referring yet again to FIGS. 14,15 and 16, cooking apparatus 530 further comprises a hollow, generally parallelepiped-shaped intermediate vessel 670 that is adapted to be coaxially aligned with lower vessel 540 and upper vessel 600 and interposed therebetween. Intermediate vessel 670 has a third right sidewall 680a and a third left sidewall 680b parallel to third right sidewall 680a. Also, intermediate vessel 670 has a third front sidewall 680c and a third rear sidewall (not shown) parallel to third front sidewall 680c. Third right sidewall 680a and third left sidewall 680b are perpendicular to third front sidewall 550c and the third rear sidewall. In addition, intermediate vessel 670 defines an open third bottom edge or bottom end portion 685. A horizontal, generally planar third top wall 690 is integrally connected to third sidewalls 680a/b/c and the third rear sidewall. Previously mentioned perforations 230 are formed through third top wall 690 for convective heat transfer therethrough. This configuration of third sidewalls 680a/b/c and the third rear sidewall in combination with third top wall 690 define a third space or third volume 700 therebetween. Elevation of third top wall 690 is slightly below an upper end portion of third sidewalls 680a/b/c and the third rear sidewall, so that third top wall 690 and the upper end portion of third sidewalls 680a/b/c and the third rear sidewall define a third recess 710 therebetween and also defines a raised third perimeter lip 720 extending around third recess 710 for reasons provided hereinbelow. Third top wall 690 defines the previously mentioned plurality of perforations 230 therethrough for reasons stated hereinabove. Perforations 230 may be arranged in a predetermined pattern, such as in parallel lines, for the reasons previously discussed.

As best seen in FIGS. 14 and 16, bottom end portion 685 of intermediate vessel 670 is inwardly bent or inwardly crimped so as to inwardly project into first recess 580 and rest on first perimeter lip 590. A cut-out 712 is formed in each bottom corner of intermediate vessel 685 to allow inward bending or inward crimping of bottom end portion 685. In this manner, intermediate vessel 670 will be centered and vertically stabilized on lower vessel 540. In other words, the inwardly bent or crimped bottom end portion 685 functions as an obstruction to lateral displacement of intermediate vessel 670 with respect to lower vessel 540 in order to center and vertically stabilize intermediate vessel 670 on lower vessel 540. Similarly, bottom end portion 615 of upper vessel 600 is inwardly bent or crimped so as to inwardly project into third recess 710 and rest on third perimeter lip 720. Cut-out 712 is formed in each bottom corner of upper vessel 685 to allow inward bending or inward crimping of bottom end portion 685. In this manner, upper vessel 600 will be centered and vertically stabilized on intermediate vessel 670. In other words, the inwardly bent or crimped bottom end portion 615 functions as an obstruction to lateral displacement of upper vessel 600 with respect to intermediate vessel 670 in order to center and vertically stabilize upper vessel 600 on intermediate vessel 670. In addition, a plurality of side handles 725 are connected to at least two oppositely disposed sidewalls, such as first sidewalls 550a/550b of lower vessel 540 and third sidewalls 680a/680b of intermediate vessel 670 for individually handling or transporting lower vessel 540 and intermediate vessel 670. It should be appreciated that, although only one intermediate vessel 670 is shown, there may be a plurality of intermediate vessels 670 interposed between lower vessel 540 and upper vessel 600 for simultaneously cooking a plurality of food items, wherein at least one food item is disposed in upper vessel 600 and other food items are disposed in respective ones of the plurality of intermediate vessels 670. In this regard, simultaneously cooking a plurality of food items saves time when there is a need to prepare a complete meal consisting of more than one food item. The heat transfer process applicable to cooking apparatus 410 is also substantially applicable to cooking apparatus 530 and will not be repeated here for reasons of brevity.

Referring to FIGS. 14, 15 and 16, cooking apparatus 530 may include a temperature sensing device in the form of a commercially available "reversible" temperature label 730 coupled, such as by a heat-resistant adhesive layer 735, to an exterior of any of lower vessel 540, intermediate vessel 670 and/or upper vessel 600. The adhesive composition of adhesive layer may be the previously mentioned ultraviolet (UV) cross-linkable acrylic. Temperature label 730 is "reversible" in the sense that temperature label 730 will measure temperature as the temperature both increases and decreases. A purpose of temperature label 730 is to measure and monitor temperature within first volume 570, second volume 640 and/or third volume 700 in order to properly cook food items 20/448 placed therein. Temperature label 730 includes a plurality of liquid crystal display elements 740 that are each responsive to a specific temperature. For example, a first one of the liquid crystal display elements 740 will show a first specific color when a first temperature is sensed and a second one of the liquid crystal display elements 740 will show a second specific color when a second temperature is sensed. As previously mentioned, temperature label 730 is coupled to the exterior of lower vessel 540, upper vessel 600 and/or intermediate vessel 670. In this regard, heat transfer from first volume 570, second volume 640 and third volume 700 will occur by conduction through sidewalls 550a/680a/610a and adhesive layer 735 to the corresponding temperature label 730. Thus, knowing the composition (e.g., aluminum) and thickness (e.g., 0.080 inches or 2 millimeters) of sidewalls 550a/680a/610a and thickness (e.g., 0.007 inches or 0.17 millimeters) of adhesive layer 735 and thermal conductivity coefficients therefor (e.g., about 215 watts per Kelvin per meter (W/k·m) at 150° Kelvin for aluminum), a person of ordinary skill in the art could deduce what the temperature within volumes 570/640/700 would be for a given temperature measurement displayed by temperature label 730. This information could be provided in the form of an operating instruction manual by a manufacturer of cooking apparatus 530 to a prospective user or purchaser of cooking apparatus 530. A commercially available temperature label that may be suitable for this purpose is the "RLC-60 SERIES REVERSIBLE TEMPERATURE LABEL, MULTI-TEMPERATURE LIQUID CRYSTAL STRIP" that may be available from Omega Engineering, Incorporated located in Stamford, Conn., U.S.A. This temperature label has 16 indicating levels in two-degree Fahrenheit and one-degree centigrade increments. Each temperature increment has an adjacent temperature square associated with that specific temperature increment. The temperature square becomes a green color to indicate the specific temperature that is sensed.

Figure 17:
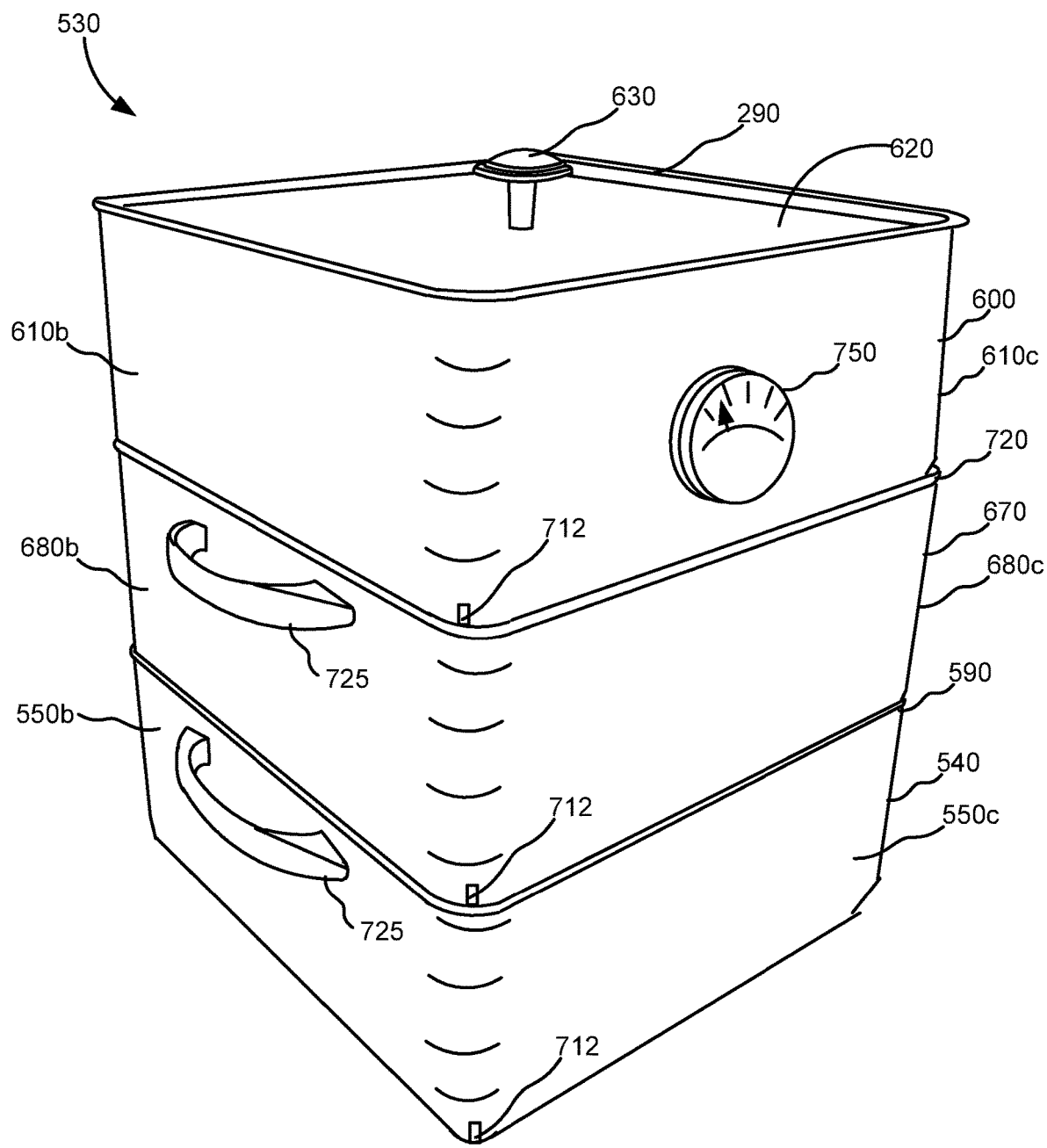
FIG. 17 is a view in perspective of the sixth embodiment stackable cooking apparatus including an upper vessel, a lower vessel and an intermediate vessel interposed between the upper vessel and the lower vessel, this view also showing a temperature sensing device in the form of a magnetic dial thermometer magnetically coupled to the upper vessel.

Referring to FIG. 17, cooking apparatus 530 may include a temperature sensing device in the form of a commercially available magnetic dial thermometer 750 magnetically coupled to an exterior of any of lower vessel 540, intermediate vessel 670 and/or upper vessel 600. A purpose of dial thermometer 750 is to measure and monitor temperature within first volume 570, second volume 640 and/or third volume 700 in order to properly cook food items 20/448 placed therein. As previously mentioned, dial thermometer 750 is coupled to the exterior of lower vessel 540, upper vessel 600 and/or intermediate vessel 670. Thus, heat transfer from first volume 570, second volume 640 and third volume 700 will occur by conduction through sidewalls 550a/680a/610a to the corresponding dial thermometer 750.

Therefore, knowing the composition and thickness of sidewalls 550a/680a/610a and thermal conductivity coefficients therefor, a person of ordinary skill in the art could deduce what the temperature within volumes 570/640/700 would be for a given temperature measurement displayed by dial thermometer 750. This information could be provided in the form of an operating instruction manual by a manufacturer of cooking apparatus 530 to a prospective user or purchaser of cooking apparatus 530. A commercially available magnetic dial thermometer that may be suitable for this purpose is the "SERIES ST SURFACE MOUNT THERMOMETER" that may be available from Dwyer Instruments, Incorporated located in Michigan City, Ind., U.S.A. This magnetic surface thermometer includes a dual magnet design that allows mounting on any ferrous surface. A bi-metallic thermal sensing coil provides a quick temperature measurement with ±2% full scale accuracy.

Figure 18:
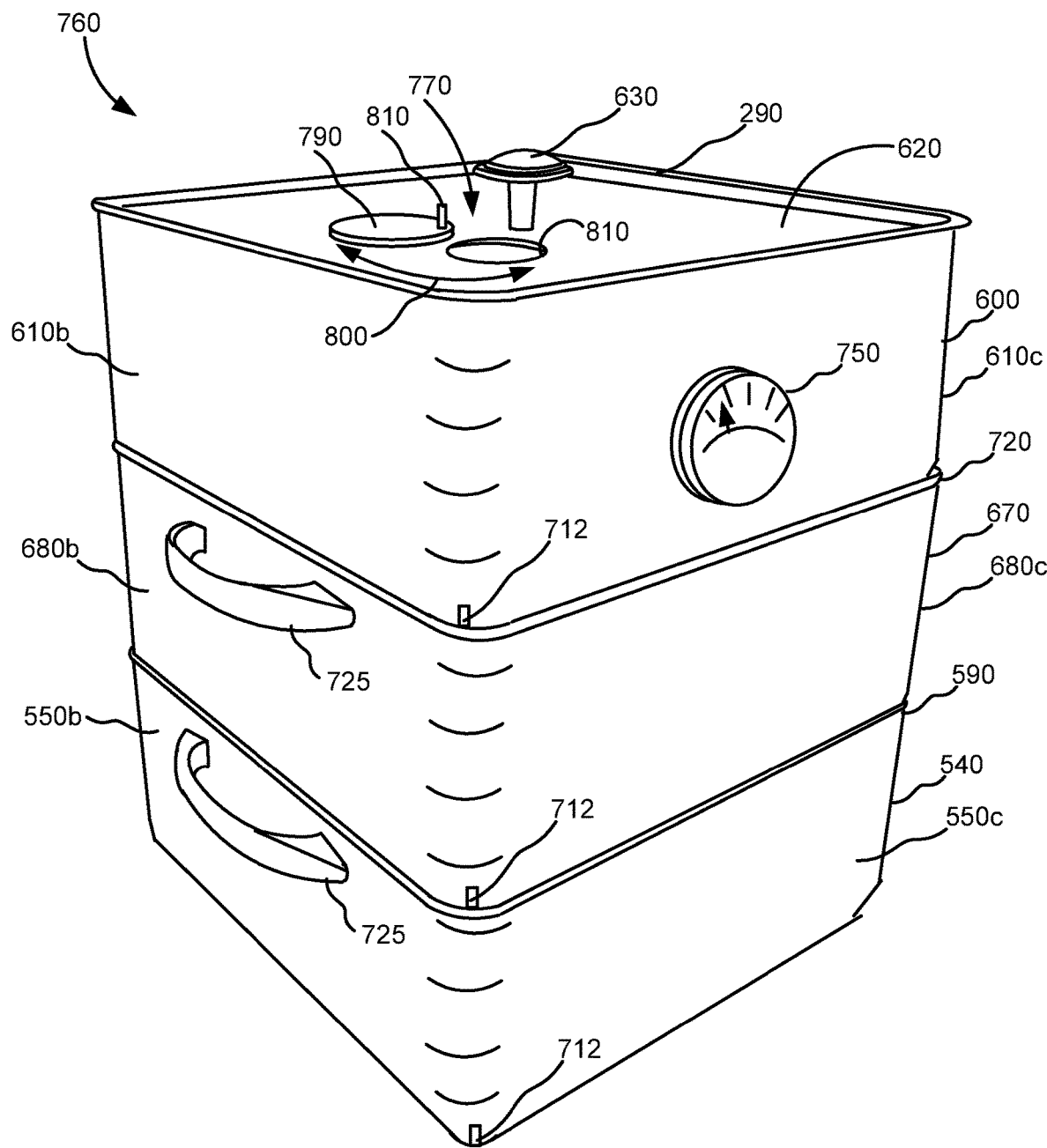
FIG. 18 is a view in perspective of a seventh embodiment stackable cooking apparatus including a temperature sensing device in the form of the magnetic dial thermometer magnetically coupled to the upper vessel, and an openable and closeable vent assembly associated with a top wall of the upper vessel.

In FIG. 18, there is shown a seventh embodiment stackable cooking apparatus, generally referred to as 760, for cooking food items 20/448. Seventh embodiment stackable cooking apparatus (hereinafter referred to as "cooking apparatus 760") is substantially similar to cooking apparatus 530, except an openable and closeable vent assembly, generally referred to as 770, is in communication with second volume 640 both for venting moisture from second volume 640 and for maintaining moisture within second volume 640. Vent assembly 770 is defined by a vent hole 780 formed in second top wall 620 and includes a vent cover 790 adapted to open and close vent hole 780. In this regard, vent cover 790 can be manually rotated or pivoted in a direction of arrow 800 about a pivot pin 810 connected to an exterior of second top wall 620. When vent cover 790 is caused to cover vent hole 780, moisture will be substantially retained within cooking apparatus 760 and food items 20/448 will be steamed. When vent cover 790 is caused to uncover vent hole 780, moisture will be substantially released from cooking apparatus 760 and food items 20/448 will be baked. Thus, it should be appreciated that cooking apparatus 760 is versatile and functions as a "combi-steamer" because a single cooking apparatus 760 can be used both for steaming food items 20/448 and for baking food items 20/448.

Figure 19:
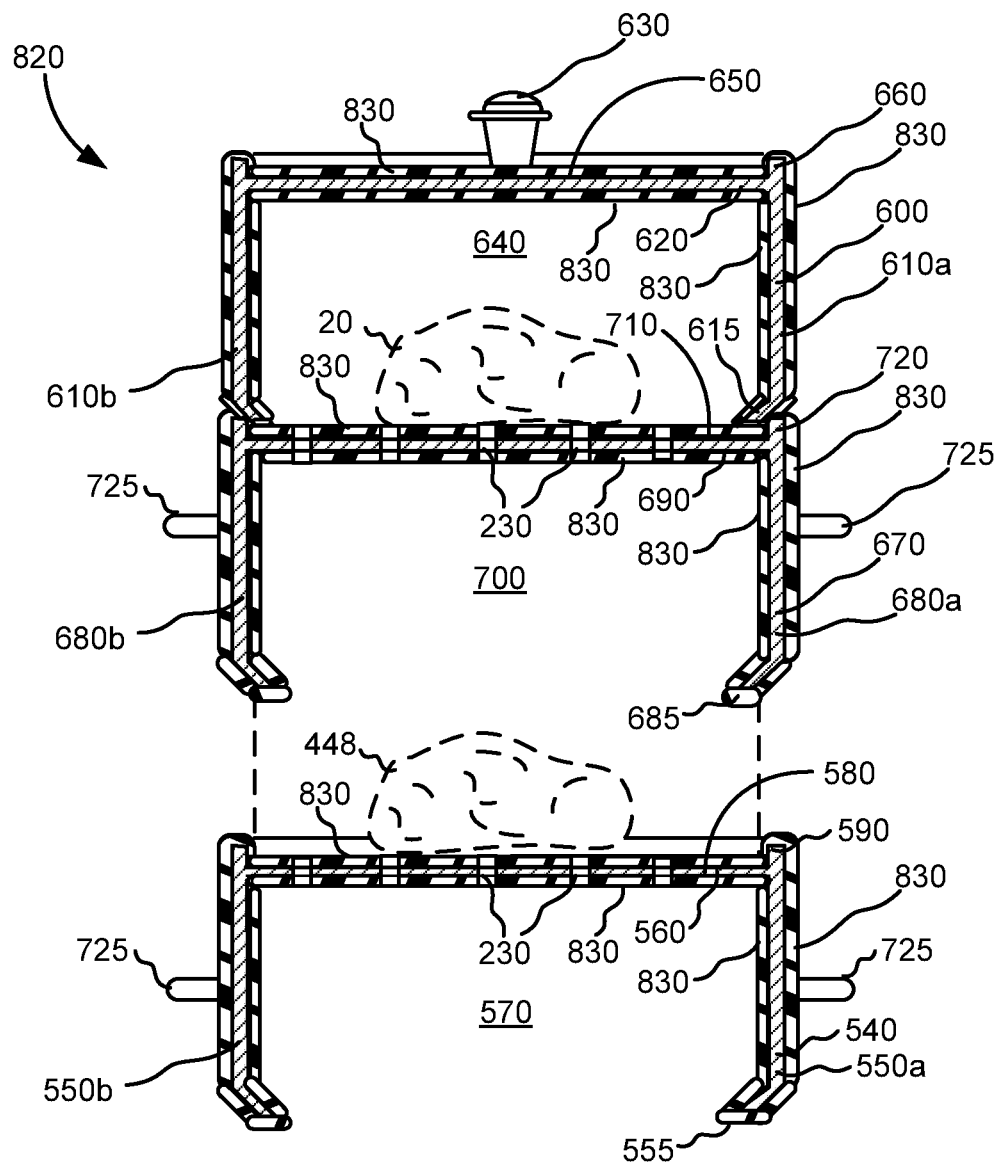
FIG. 19 is a view in vertical section of an eighth embodiment stackable cooking apparatus including a protective layer deposited on substantially all surfaces of the eighth embodiment stackable cooking apparatus, thickness of the protective layer being exaggerated for clarity.

In FIG. 19, an eighth embodiment stackable cooking apparatus, generally referred to as 820, is substantially similar to cooking apparatus 530, except eighth embodiment stackable cooking apparatus 820 (hereinafter referred to as "cooking apparatus 820") includes a non-toxic, heat resistant protective layer 830 deposited on and covering substantially all surfaces of cooking apparatus 820. A purpose of protective layer 820 is to make cooking apparatus 820 "dishwasher safe." The terminology "dishwasher safe" is defined herein to mean presence of a protective layer to reduce risk that the metal surfaces of cooking apparatus 820 will rust or otherwise deteriorate over time due to repeated washing in an automatic dishwasher (not shown). In this regard, protective layer 830 may comprise a polytetrafluoroethlyne (PTFE) polymer composition. In this regard, such a polymer can be "TEFLON®", which may be available from E.I. du Pont de Nemours and Company located in Wilmington, Del., U.S.A.

Figure 20:
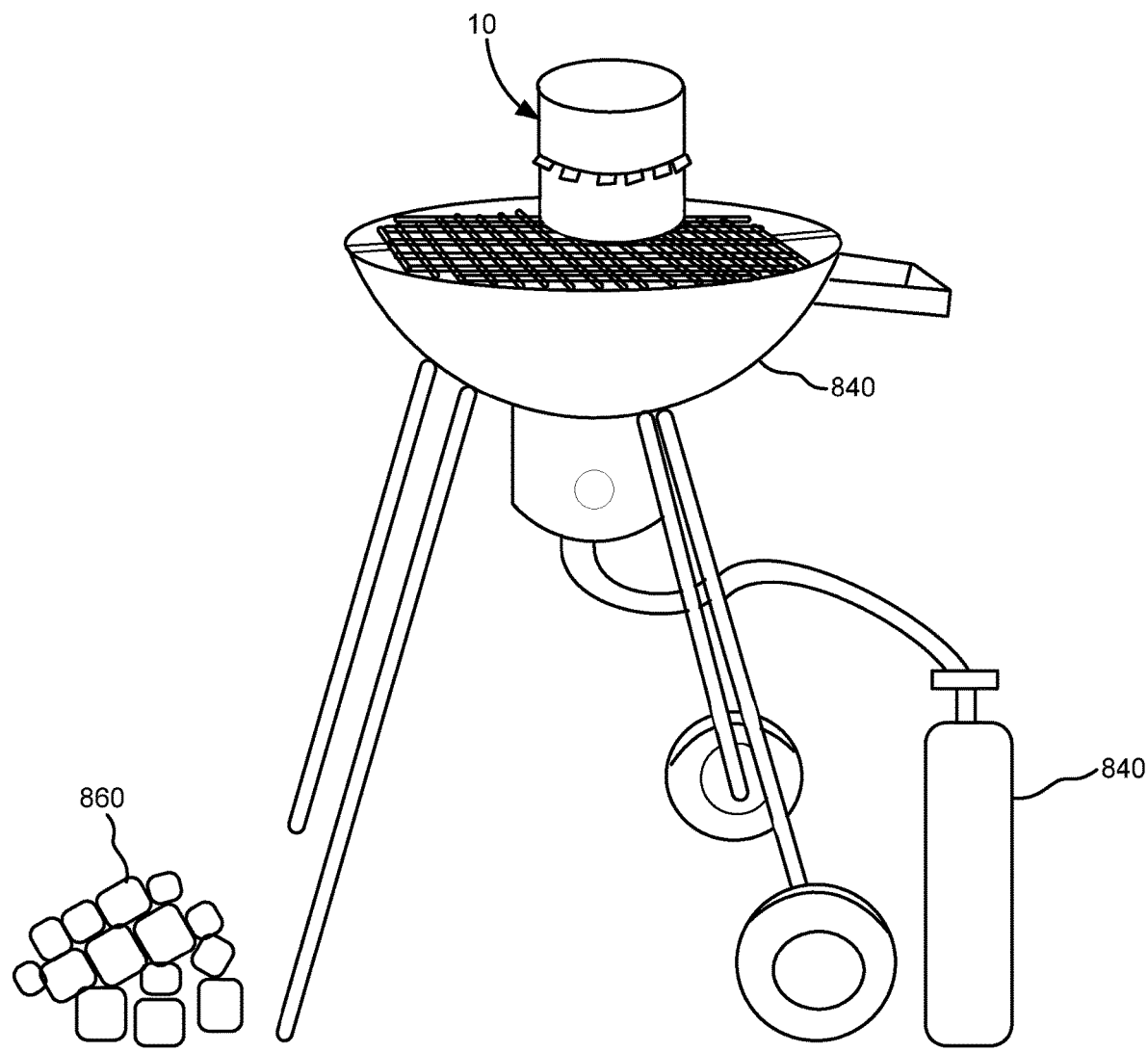
FIG. 20 is a view in perspective of the first embodiment stackable cooking apparatus for use upon a bar-b-que grill device.
Figure 21:
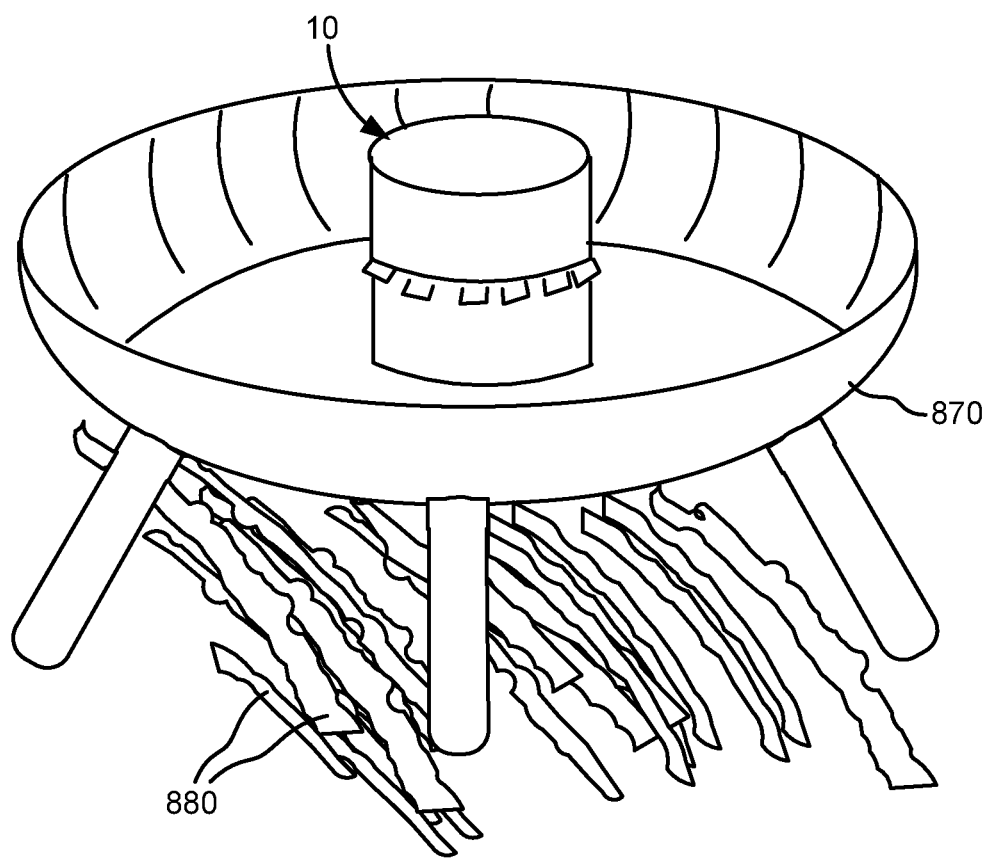
FIG. 21 is a view in perspective of the first embodiment stackable cooking apparatus for use upon a campsite cooking device.

With reference to FIGS. 20 and 21, any of the embodiments of the invention, such as cooking apparatus 10, can be used in various venues and environments. For example, cooking apparatus 10 can be heated on a bar-b-que grill appliance 840 or similar grilling appliance by means of a liquid propane supply 850 or charcoal briquettes 860. As another example, cooking apparatus 10 can be heated on a campsite cooking appliance 870 by means of burning scavenged tree branches or twigs 880 or other naturally occurring biomass material.

In addition, it should be appreciated that any of the embodiments of the invention can comprise any one of a variety of materials. In this regard, the cooking apparatus can comprise a metal or metal alloy (e.g., aluminum, copper, steel, cast iron and alloys thereof); a heat-resistant borosilicate glass (e.g., a non-crystalline composition including sand, soda ash, limestone, feldspar and borax that is melted and cast into the desired shape); a glass-ceramic (e.g., heat treated glass forming a fine crystalline structure); a ceramic (e.g., mixture of water, clays, fluxing minerals such as feldspar, sand), earthenware (e.g., terracotta) or other suitable material and combinations thereof. All such materials are contemplated herein as being suitable materials useable with the invention. In addition, the handles 480/630/680 may comprise a heat-resistant plastic (e.g., a thermoplastic polyester resin) rather than a metal, if desired.

Illustrative Methods:

An illustrative method associated with an exemplary embodiment for manufacturing the stackable cooking apparatus for cooking a food item will now be described.

Figure 22:
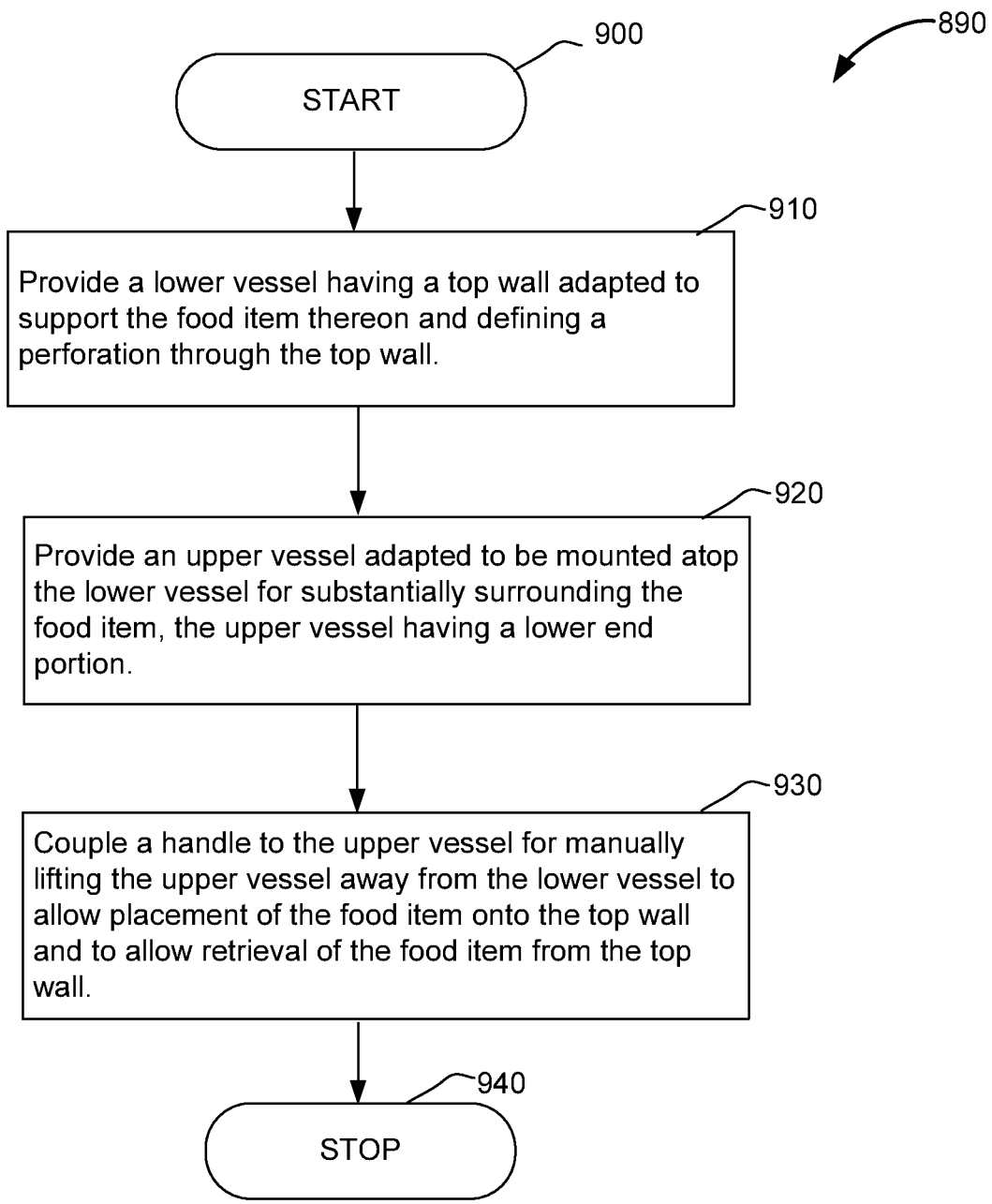
FIG. 22 is a flowchart showing an illustrative method of manufacturing the stackable cooking apparatus for cooking a food item.

Referring to FIG. 22, an illustrative method, generally referred to as 890, is provided for manufacturing a stackable cooking apparatus for cooking a food item. The method starts at a step 900. At a step 910, a lower vessel having a top wall adapted to support the food item thereon and defining a perforation through the top wall is provided. At a step 920, an upper vessel adapted to be mounted atop the lower vessel for substantially surrounding the food item is provided, the upper vessel having a lower end portion. At a step 930, a handle is coupled to the upper vessel for manually lifting the upper vessel away from the lower vessel to allow placement of the food item onto the top wall and to allow retrieval of the food item from the top wall. The method stops at a step 940.

Other modifications and implementations will occur to those skilled in the art without departing from the spirit and the scope of the invention as claimed. For example, a stove may include the stackable cooking apparatus as an integral component thereof, so that the stove and stackable cooking apparatus form a single unit. In this example, there would be no need for the user to allocate space to separately store the stackable cooking apparatus and then remember where the stackable cooking apparatus was stored; rather, the stackable cooking apparatus would always be visible and conveniently available for cooking the food item. As another example, the stackable cooking apparatus can include a fan and conduit attachment coupled at one end thereof to the interior of the upper vessel and in communication with an external atmosphere at another end thereof for exhausting smoke, cooking odors and grease to the external atmosphere. In this example, the vicinity of the stackable cooking apparatus and stove will remain free of the smoke, cooking odors and grease. As yet another example, one or more vessels comprising the stackable cooking apparatus may include a rotating spit, so that the apparatus functions as a rotisserie. As a further example, the apparatus can include radiant heating elements for radiant heating of the food item. Accordingly, the description hereinabove is not intended to limit the invention, except as indicated in the following claims.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. The issued patent may not be interpreted to be limited to the specific examples or embodiments or methods specifically and/or expressly disclosed herein. Under no circumstances may the issued patent be interpreted to be limited by any statement made by any Examiner or any other official or employee of the Patent and Trademark Office unless such statement is specifically and without qualification or reservation expressly adopted in a responsive writing by Applicant(s).

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Therefore, provided herein are a stackable cooking apparatus for cooking a food item and a method of manufacturing the stackable cooking apparatus.

What is claimed is:

1. A stackable cooking apparatus for cooking a food item, the stackable cooking apparatus supportable by a heat source, the stackable cooking apparatus comprising:
   a lower vessel having a top wall having a plurality of perforations, the top wall being adapted to support the food item thereon, the lower vessel having a recess in an upper portion thereof, the lower vessel further having an open bottom to allow thermal energy radiated from a heat source on which the lower vessel is supported to directly heat a hollow interior of the lower vessel, the open bottom opening directly onto the heat source, the heat source supporting the stackable cooking apparatus; and
   an upper vessel adapted to be mounted atop the lower vessel and substantially surround the food item, the upper vessel including a crimped end portion defining an open bottom that opens to a hollow interior of the upper vessel, the upper vessel being adapted to receive heat thereinto flowing from the hollow interior of the lower vessel, through the plurality of perforations of the lower vessel, and into the hollow interior of the upper vessel to heat the hollow interior of the upper vessel for cooking the food item, the crimped end portion of the upper vessel being configured for mating engagement with the recess of the lower vessel.

2. The stackable cooking apparatus of claim 1, further comprising:
   an intermediate vessel interposed between the upper vessel and the lower vessel for cooking an additional food item therein, wherein the intermediate vessel includes a top wall having a plurality of perforations, the top wall of the intermediate vessel being adapted to support the additional food item thereon, the intermediate vessel having a recess in an upper portion thereof configured for mating engagement with the crimped end portion of the upper vessel, the intermediate vessel including a crimped portion defining an open bottom that opens to a hollow interior of the intermediate vessel and configured for mating engagement with the recess of the lower vessel, the intermediate vessel being adapted to receive heat thereinto flowing from the hollow interior of the lower vessel, through the plurality of perforations of the lower vessel, and into the hollow interior of the intermediate vessel, for heating the hollow interior of the intermediate vessel to cook the additional food item.

3. The stackable cooking apparatus of claim 2, further comprising:
a plurality of handles coupled to respective ones of the upper vessel, the intermediate vessel and the lower vessel for transporting the upper vessel, the intermediate vessel and the lower vessel.

4. The stackable cooking apparatus of claim 1, further comprising:
a temperature sensing device coupled to the upper vessel for sensing temperature in the upper vessel.

5. A stackable cooking apparatus for cooking a food item, the stackable cooking apparatus being supportable by a heat source, the stackable cooking apparatus comprising:
a lower vessel having at least one first sidewall and a first top wall defining a first volume therebetween, the first top wall being adapted to support the food item thereon and defining a plurality of perforations through the first top wall, the lower vessel defining a recess in an upper portion thereof, the lower vessel further having an open bottom to allow thermal energy radiated from a heat source on which the lower vessel is supported to directly heat the first volume, the open bottom opening directly onto the heat source, the heat source supporting the stackable cooking apparatus; and
an upper vessel adapted to be coaxially mounted atop the lower vessel, the upper vessel having at least one second sidewall and a second top wall defining a second volume therebetween for substantially surrounding the food item supported by the first top wall, the upper vessel further including a crimped end portion defining an open bottom that opens to the second volume, the second volume being adapted to receive heat thereinto flowing along a heat transfer flow path extending from the first volume, through the plurality of perforations and into the second volume, the crimped end portion being configured for mating engagement with the recess of the lower vessel, whereby the second volume heats while the heat flows into the second volume, whereby the food item cooks while the second volume heats and whereby the upper vessel and the lower vessel are vertically connected while the crimped end portion of the upper portion matingly engages the recess of the lower vessel.

6. The stackable cooking apparatus of claim 5, further comprising:
an intermediate vessel interposed between the upper vessel and the lower vessel for cooking an additional food item, wherein the intermediate vessel includes a top wall having a plurality of perforations, the top wall of the intermediate vessel being adapted to support the additional food item thereon, the intermediate vessel having a recess in an upper portion thereof configured for mating engagement with the crimped end portion of the upper vessel, the intermediate vessel including a crimped end portion defining an open bottom that opens to a third volume, the crimped end portion of the intermediate vessel being configured for mating engagement with the recess of the lower vessel, the intermediate vessel being adapted to receive heat thereinto flowing from the first volume of the lower vessel, through the plurality of perforations of the lower vessel, and into the third volume of the intermediate vessel, for heating the third volume of the intermediate vessel to cook the additional food item.

7. The stackable cooking apparatus of claim 6, further comprising:
a plurality of handles coupled to respective ones of the upper vessel, the intermediate vessel and the lower vessel for individually transporting the upper vessel, the intermediate vessel and the lower vessel.

8. The stackable cooking apparatus of claim 6, further comprising:
a thermometer coupled to a predetermined one of the upper vessel, the intermediate vessel and the lower vessel and disposed in temperature sensing communication with the second volume for sensing temperature therein.

9. A stackable cooking apparatus for cooking a food item, the stackable cooking apparatus supportable by a heat source, the stackable cooking apparatus comprising:
a lower vessel having a top wall having a plurality of perforations, the top wall being adapted to support the food item thereon, the lower vessel having a recess in an upper portion thereof, the lower vessel further having an open bottom to allow thermal energy radiated from a heat source on which the lower vessel is supported to directly heat a hollow interior of the lower vessel, the open bottom opening directly onto the heat source, the heat source supporting the stackable cooking apparatus;
an intermediate vessel for cooking a food item therein, wherein the intermediate vessel includes a top wall having a plurality of perforations, the top wall of the intermediate vessel being adapted to support the food item thereon, the intermediate vessel having a recess in an upper portion thereof and a crimped portion defining an open bottom that opens to a hollow interior of the intermediate vessel, wherein the crimped portion is configured for mating engagement with the recess of the lower vessel, the intermediate vessel being adapted to receive heat thereinto flowing from the hollow interior of the lower vessel, through the plurality of perforations of the lower vessel, and into the hollow interior of the intermediate vessel, for heating the hollow interior of the intermediate vessel to cook the food item; and
an upper vessel adapted to be mounted atop the lower vessel and substantially surround a further food item, the upper vessel including a crimped end portion defining an open bottom that opens to a hollow interior of the upper vessel, the upper vessel being adapted to receive heat thereinto flowing from the hollow interior of the intermediate vessel, through the plurality of perforations of the intermediate vessel, and into the hollow interior of the upper vessel to heat the hollow interior of the upper vessel for cooking the further food item, the crimped end portion of the upper vessel being configured for mating engagement with the recess of the intermediate vessel.

10. The stackable cooking apparatus of claim 9, further comprising:
a plurality of handles coupled to respective ones of the upper vessel, the intermediate vessel and the lower vessel for transporting the upper vessel, the intermediate vessel and the lower vessel.

* * * * *